US011733767B2

(12) United States Patent
Kakkireni et al.

(10) Patent No.: US 11,733,767 B2
(45) Date of Patent: Aug. 22, 2023

(54) POWER MANAGEMENT FOR MULTIPLE-CHIPLET SYSTEMS

(71) Applicant: QUALCOMM Incorporated, San Diego, CA (US)

(72) Inventors: Prashanth Kumar Kakkireni, Bangalore (IN); Matthew Severson, Austin, TX (US); Kumar Kanti Ghosh, San Diego, CA (US); Shishir Joshi, Arvada, CO (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/359,350

(22) Filed: Jun. 25, 2021

(65) Prior Publication Data
US 2022/0413593 A1  Dec. 29, 2022

(51) Int. Cl.
*G06F 1/26* (2006.01)
*G06F 1/32* (2019.01)
*G06F 1/3296* (2019.01)
*H04L 12/10* (2006.01)

(52) U.S. Cl.
CPC ............ *G06F 1/3296* (2013.01); *H04L 12/10* (2013.01)

(58) Field of Classification Search
CPC .................................................. G06F 1/3296
See application file for complete search history.

(56) References Cited

U.S. PATENT DOCUMENTS

| 8,046,601 B1* | 10/2011 | Paz ........................... G06F 1/32 713/300 |
| 2005/0239518 A1* | 10/2005 | D'Agostino .......... G06F 1/3287 455/574 |
| 2005/0289374 A1 | 12/2005 | Kim et al. |
| 2011/0271161 A1* | 11/2011 | Kursun ............... G06F 11/3089 714/736 |
| 2013/0145188 A1 | 6/2013 | Gloekler et al. |
| 2014/0075446 A1* | 3/2014 | Wang ...................... G06F 21/40 718/104 |
| 2014/0157007 A1 | 6/2014 | Krishnappa |
| 2016/0357245 A1* | 12/2016 | Heo .......................... G06F 1/26 |

(Continued)

OTHER PUBLICATIONS

Partial International Search Report—PCT/US2022/031547—ISA/EPO—dated Sep. 21, 2022.

*Primary Examiner* — Mohammed H Rehman
(74) *Attorney, Agent, or Firm* — The Marbury Law Group/Qualcomm

(57) ABSTRACT

Various embodiments may include methods and systems for power management of multiple chiplets within a system-on-a-chip (SoC). Various systems may include a power management integrated circuit (PMIC) configured to supply power to a first chiplet and a second chiplet across a shared power rail. The first chiplet may be configured to obtain first sensory information throughout the first chiplet. The second chiplet may be configured to obtain second sensory information throughout the second chiplet, and may be configured to transmit a voltage change message to the first chiplet based on the second sensory information. The first chiplet may be configured to transmit a power rail adjustment message to the PMIC based on the first sensory information and the voltage change message. The PMIC may be configured to adjust the voltage of at least one of the first chiplet and the second chiplet.

31 Claims, 13 Drawing Sheets

(56) References Cited

U.S. PATENT DOCUMENTS

| | | |
|---|---|---|
| 2019/0101969 A1 | 4/2019 | Gendler et al. |
| 2019/0250697 A1 | 8/2019 | Mocanu et al. |
| 2019/0302876 A1* | 10/2019 | Pant ................... G06F 1/3287 |
| 2020/0117610 A1* | 4/2020 | Berger .................. G11C 7/20 |
| 2021/0004462 A1* | 1/2021 | Soryal ................. G06F 21/73 |
| 2021/0157390 A1* | 5/2021 | Yardi ................... G06F 3/014 |
| 2021/0294363 A1* | 9/2021 | Meunier ................ G06F 1/28 |
| 2021/0382841 A1* | 12/2021 | Robertson ........... G06F 13/4031 |
| 2022/0147126 A1* | 5/2022 | Chin ................... G06F 1/206 |

\* cited by examiner

POWER MANAGEMENT FOR MULTIPLE-CHIPLET SYSTEMS

BACKGROUND

System-on-a-chip (SoC) designs and devices are becoming more complex, implementing smaller physical profiles with ever-decreasing conductor path dimensions for transferring data at higher rates than predecessor SoCs. SoCs may utilize multiple chiplets operating as functional blocks for various purposes within a system. Multiple-chiplet systems often employ similar chiplets to standardize communications and power rails among two or more chiplets. For example, a multiple-chiplet system may utilize a power rail that is shared between the multiple chiplets. Managing a shared power rail within a multiple-chiplet system may require a significant amount of overhead processes, detracting from the efficiency of non-power related chiplet processes.

SUMMARY

Various aspects include methods and devices for managing power in a multiple chiplet in which a plurality of chiplets are organized so that one chiplet is configured as a master chiplet while the rest of the chiplets are configured as slave chiplets for purposes of gathering sensor information and providing that information to a power management integrated circuit (PMIC) configured to control power supplied to chiplets across a shared power rail.

Some aspects include a first chiplet, a second chiplet, a shared power rail coupled to the first chiplet and the second chiplet, and a power management integrated circuit (PMIC) configured to supply power to the first chiplet and the second chiplet across the shared power rail, in which: the first chiplet is configured to obtain first sensory information throughout the first chiplet; the second chiplet is configured to obtain second sensory information throughout the second chiplet and to transmit a voltage change message to the first chiplet based on the second sensory information; the first chiplet is configured to transmit a power rail adjustment message to the PMIC based on the first sensory information and the voltage change message; and the PMIC is configured to adjust voltage of at least one of the first chiplet and the second chiplet. In various aspects, the first and second sensory information may include at least one of temperature information, voltage information, or current information.

In some aspects, the first chiplet includes: a first set of sensors configured to obtain the first sensory information by measuring first sensory parameters throughout the first chiplet; a first power controller configured to receive the first sensory information from the first set of sensors; and a first communication interface configured to receive a first voltage change message from the first power controller based on the first sensory information; and the second chiplet includes: a second set of sensors configured to obtain the second sensory information by measuring second sensory parameters throughout the second chiplet; a second power controller configured to receive the second sensory information from the second set of sensors; and a second communication interface configured to receive a second voltage change message from the second power controller based on the second sensory information. In such aspects, the power rail adjustment message may be based on the first voltage change message and the second voltage change message.

Some aspects may further include an interface bus communicably connecting the PMIC, the first chiplet, and the second chiplet, in which the interface bus is a system power management interface (SPMI). In such aspects, the second chiplet may be further configured to transmit an independent power rail adjustment message to the PMIC based on the second sensory information, and the PMIC may be further configured to adjust voltage of the second chiplet based on the independent power rail adjustment message. Some aspects may further include an inter-interface circuit (I2C) bus communicably connecting the PMIC and the first chiplet, in which the first chiplet is configured to transmit the power rail adjustment message to the PMIC across the I2C bus.

Some aspects may further include a controller-to-controller interface configured to convey the voltage change message from the second chiplet to the first chiplet. Some aspects may further include a power rail shared by the first chiplet and the second chiplet and controlled by the PMIC, in which the PMIC is configured to adjust the voltage of at least one of the first chiplet and the second chiplet by adjusting a voltage across the power rail. In some aspects, the power rail may be an embedded memory (MX) power rail or a core logic (CX) power rail.

Some aspects may further include a third chiplet configured to obtain third sensory information by measuring third sensory parameters throughout the third chiplet, and configured to transmit a second voltage change message to the first chiplet based on the third sensory information, in which the power rail adjustment message is based in part on the second voltage change message, and in which the PMIC is configured to adjust the voltage of at least one of the first chiplet, the second chiplet, and the third chiplet.

Further aspects may further include a method for power management of multiple chiplets within a system-on-a-chip (SoC). Such aspects may include obtaining, via a second chiplet power controller, second chiplet sensory information throughout a second chiplet; determining, via the second chiplet power controller, whether a voltage of the second chiplet should be adjusted based on the second chiplet sensory information; transmitting, to a first chiplet communication interface of a first chiplet from a second chiplet communication interface, a voltage change message in response to determining that a voltage of the second chiplet should be adjusted; generating, via the first chiplet communication interface, a power rail adjustment message based on the voltage change message; transmitting, via the first chiplet communication interface, the power rail adjustment message to a power management integrated circuit (PMIC); and adjusting, via the PMIC, a voltage across a power rail shared by the first chiplet and the second chiplet based on the power rail adjustment message. In such aspects, the second sensory information may include at least one of temperature information, voltage information, or current information. Some aspects may further include measuring, via sensors located throughout the second chiplet, sensory parameters, in which the second sensory information is based on the sensory parameters. In some aspects, determining whether a voltage of the second chiplet should be adjusted based on the second chiplet sensory information may include determining whether the second sensory information indicates that a sensory parameter is outside of a threshold range.

Some aspects further include obtaining, via a first chiplet power controller, first chiplet sensory information throughout the first chiplet; and determining, via the first chiplet power controller, whether a voltage of the first chiplet should be adjusted based on the first chiplet sensory information, in which generating the power rail adjustment message based on the voltage change message further includes generating the power rail adjustment message based on the voltage change message and the first chiplet sensory information in response to determining that a voltage of the first chiplet should be adjusted.

In some aspects, obtaining second chiplet sensory information throughout the second chiplet may include iteratively obtaining second chiplet power information throughout the second chiplet. Such aspects may further include: initializing a down vote counter on the second chiplet with a down counter value; determining whether the voltage of the second chiplet should be decreased based on the second chiplet power information; and incrementing the down vote counter in response to determining that the voltage of the second chiplet should be decreased, in which the down vote counter is incremented for each iteration of obtaining second chiplet sensory information indicating that the voltage of the second chiplet should be decreased, in which transmitting the voltage change message to the first chiplet includes transmitting the voltage change message in response to the down vote counter reaching the down vote counter value. Some aspects may further include transmitting, from the first chiplet to the second chiplet, a reset message to cause the second chiplet to reset the down vote counter.

Some aspects may further include initializing an aggregation window with a time limit value, in which the power rail adjustment message is generated upon expiration of the aggregation window. Some aspects may further include initializing, in the second chiplet, a vote table including a previous voltage recommendation of the second chiplet, in which determining whether the voltage of the second chiplet should be adjusted based on the second chiplet sensory information includes comparing a present voltage recommendation indicated by the second chiplet sensory information against the previous voltage recommendation; and transmitting, to the first chiplet from the second chiplet, a voltage change message in response to determining that the previous voltage recommendation does not match the present voltage recommendation.

Some aspects may further include initializing, in the first chiplet, a global vote table including a previous voltage recommendation of the second chiplet; comparing a present voltage recommendation indicated in the voltage change message against the previous voltage recommendation; generating the power rail adjustment message in response to determining that the present voltage recommendation does not match the previous voltage recommendation; and changing the previous voltage recommendation to match the present voltage recommendation.

Further aspects include method for a first chiplet to manage a power rail of multiple chiplets within a system-on-a-chip (SoC), including: receiving, from a second chiplet, a voltage change message including second chiplet sensory information measured throughout the second chiplet; determining whether a voltage of the second chiplet should be adjusted based on the voltage change message; and transmitting, to a power management integrated circuit (PMIC), a power rail adjustment message in response to determining that a voltage of the second chiplet should be adjusted, in which the power rail adjustment message includes instructions to cause the PMIC to adjust the voltage of the second chiplet.

Some aspects may further include obtaining first chiplet sensory information throughout the first chiplet; and determining whether a voltage of the first chiplet should be adjusted based on the first chiplet sensory information, in which generating the power rail adjustment message based on the voltage change message further includes generating the power rail adjustment message based on the voltage change message and the first chiplet sensory information in response to determining that a voltage of the first chiplet should be adjusted. Some aspects may further include initializing an aggregation window with a time limit value, in which the power rail adjustment message is generated upon expiration of the aggregation window.

Some aspects may further include: initializing, in the first chiplet, a global vote table including a previous voltage recommendation of the second chiplet; comparing a present voltage recommendation indicated in the voltage change message against the previous voltage recommendation; generating the power rail adjustment message in response to determining that the present voltage recommendation does not match the previous voltage recommendation; and changing the previous voltage recommendation to match the present voltage recommendation.

Further aspects further include an SoC, including: a first chiplet; a second chiplet; means for obtaining second chiplet sensory information throughout a second chiplet; means for determining whether a voltage of the second chiplet should be adjusted based on the second chiplet sensory information; means for transmitting, to the first chiplet from the second chiplet, a voltage change message in response to determining that a voltage of the second chiplet should be adjusted; means for generating a power rail adjustment message based on the voltage change message; means for transmitting the power rail adjustment message to a power management integrated circuit (PMIC) from the first chiplet; and means for adjusting, via the PMIC, a voltage across a power rail shared by the first chiplet and the second chiplet based on the power rail adjustment message. Some aspects may further include means for measuring sensory parameters, in which the second sensory information is based on the sensory parameters.

Some aspects may further include means for obtaining first chiplet sensory information throughout the first chiplet; and means for determining whether a voltage of the first chiplet should be adjusted based on the first chiplet sensory information, in which means for generating the power rail adjustment message based on the voltage change message includes means for generating the power rail adjustment message based on the voltage change message and the first chiplet sensory information in response to determining that a voltage of the first chiplet should be adjusted.

Some aspects may further include means for initializing a down vote counter on the second chiplet with a down counter value, in which means for obtaining second chiplet sensory information throughout the second chiplet includes means for iteratively obtaining second chiplet power information throughout the second chiplet; means for determining whether the voltage of the second chiplet should be decreased based on the second chiplet power information; and means for incrementing the down vote counter in response to determining that the voltage of the second chiplet should be decreased, in which the down vote counter is incremented for each iteration of obtaining second chiplet sensory information indicating that the voltage of the second chiplet should be decreased; in which means for transmitting the voltage change message to the first chiplet includes means for transmitting the voltage change message in response to the down vote counter reaching the down vote counter value. Such aspects may further include means for transmitting, from the first chiplet to the second chiplet, a reset message to cause the second chiplet to reset the down vote counter.

Some aspects may further include means for initializing an aggregation window with a time limit value, in which the power rail adjustment message is generated upon expiration of the aggregation window. Some aspects may further include means for initializing, in the second chiplet, a vote table including a previous voltage recommendation of the second chiplet, in which means for determining whether the voltage of the second chiplet should be adjusted based on the second chiplet sensory information includes means for comparing a present voltage recommendation indicated by the second chiplet sensory information against the previous voltage recommendation; and means for transmitting, to the first chiplet from the second chiplet, a voltage change message in response to determining that the previous voltage recommendation does not match the present voltage recommendation.

Some aspects may further include means for initializing, in the first chiplet, a global vote table including a previous voltage recommendation of the second chiplet; means for comparing a present voltage recommendation indicated in the voltage change message against the previous voltage recommendation; means for generating the power rail adjustment message in response to determining that the present voltage recommendation does not match the previous voltage recommendation; and means for changing the previous voltage recommendation to match the present voltage recommendation.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
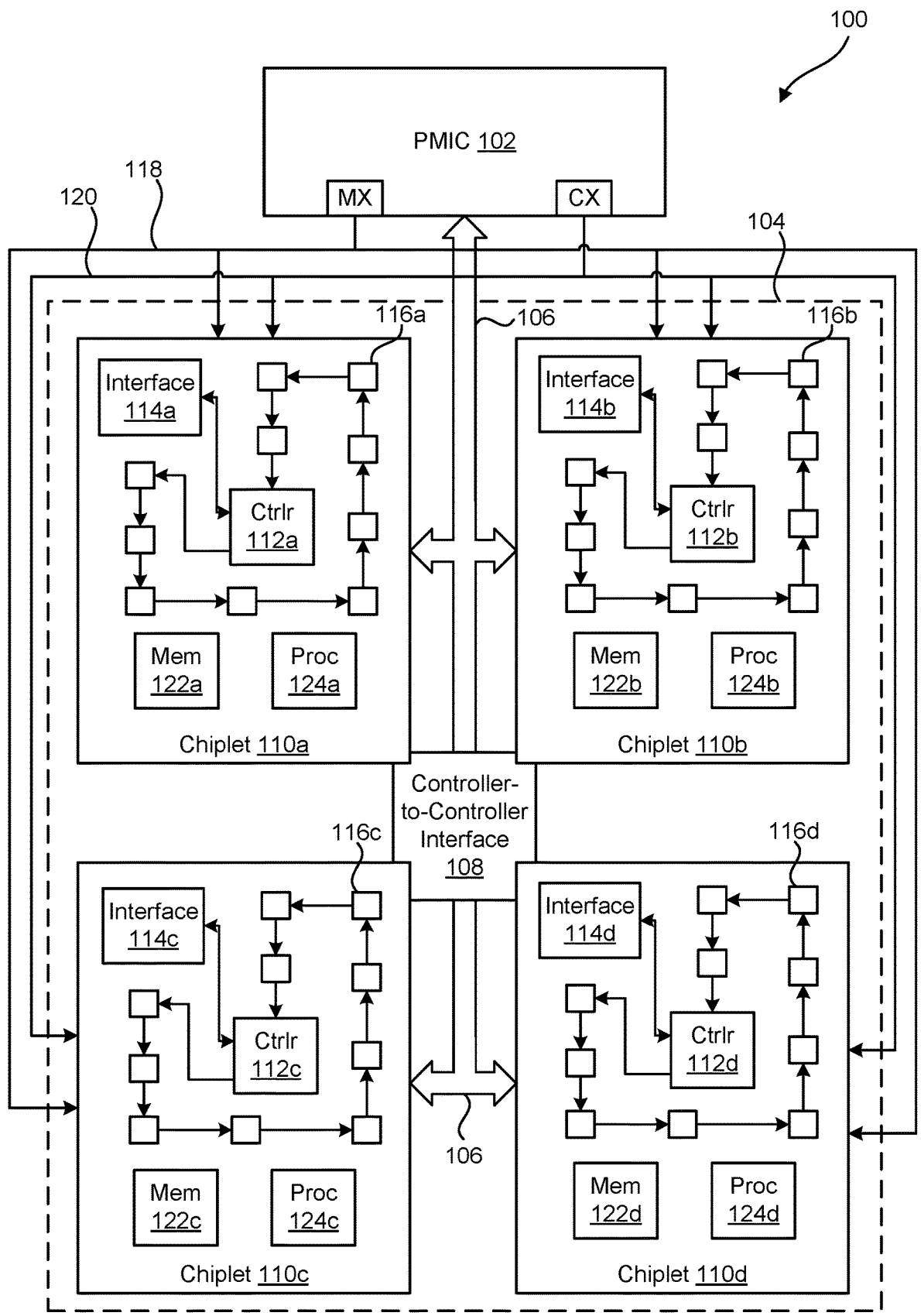
FIG. 1 is a component block diagram illustrating an example multiple chiplet-system circuitry suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments include methods and devices for managing power in a multiple chiplet. A system-on-a-chip (SoC) including a plurality of chiplets may be organized so that one chiplet is configured as a master chiplet while the rest of the chiplets are configured as slave chiplets for purposes of gathering sensor information and providing that information to a power management integrated circuit (PMIC) configured to control power supplied to chiplets across a shared power rail. The master chiplet may be configured to obtain sensory information throughout the first chiplet and receive sensory information throughout the other chiplets from slave chiplets. The slave chiplets may also transmit voltage change messages to the master chiplet and the master chiplet may transmit a power rail adjustment message to the PMIC based on sensory information from the master chiplet and/or voltage change messages provided by slave chiplets. The PMIC may be configured to adjust the voltage of at least one of the master chiplet and the slave chiplet based on messages received from the master chiplet.

The term "system-on-a-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

As used herein, the term "chiplet" is used to refer to a sub-processing unit or sub-processing device within a processing system. A chiplet may be an integrated circuit block designed to work with other similar chiplets within a processing system to execute various processes. A chiplet may include one or more processing cores to execute system processes in conjunction with other cores of associated chiplets within a system. A chiplet may include input/output (IO) functionality to communicate system data with other chiplets and/or other system devices, such as memory, power controllers, IO controllers and/or interfaces, and the like. A chiplet may be referred to as a functional block that performs processing operations within a system, such as an SoC.

Various embodiments include chiplets, methods, SoC designs, processing devices, and memory that are configured to implement the methods for managing power within a multiple-chiplet system. Various embodiments may implement a master chiplet and one or more corresponding slave chiplets to minimize the number of power management communications amongst the chiplets and between a PMIC. Various embodiments may implement aggregation windows (i.e., time frames) and vote tables to determine whether the PMIC should perform voltage micro-adjustments across power rails shared by the chiplets.

Existing power management architectures are designed for single die systems. These systems may implement power controllers or regulators serially connected to die sensors, sometimes referred to as a scan chain. The die sensors may be used to determine temperature and/or power measurements across the die for various power rails, such as a power rail designated for memory blocks and a power rail designated for processor cores. A power controller may receive thermal and/or power measurements from embedded sensors, and use such measurement to determine whether one or more power rails should be controlled to adjust the voltage based on the needs of memory blocks and cores within the die. The power controller may communicate with a PMIC to adjust the voltage values across one or more power rails of the die.

A multiple-chiplet system may have multiple dies within a single SoC package, and the chiplets may share one or more power rails as supplied from a single PMIC. Power management techniques of a single die system may be implemented in a multiple-chiplet system. For example, each chiplet may implement internal sensors and a power controller, and each chiplet may communicate requests for decreased or increased voltage to the PMIC. In some situations, this configuration may lead to an overload of the PMIC, which potentially could delay power rail adjustments as PMIC processes may be prioritized to receive and translate incoming voltage change messages from each chiplet.

As another example of conventional power management techniques in a single die multiple-chiplet system, each chiplet may have an independent scan chain, every scan chain may be connected together serially to form a single system scan chain, and one power controller may aggregate the scan chain measurements for the entire package across all chiplets. Thus, multiple scan chains corresponding to multiple chiplets may be joined together to form a "single die-like" scan chain. The resulting joined scan chain may be used to determine voltage adjustments that the PMIC should perform across all chiplets.

However, such a single scan chain configuration for managing power of multiple chiplets may manage power inefficiently and cause system errors due to insufficient voltage. In particular, the physical length of a unitary scan chain may cause scans to take an undesirable amount of time. For example, joining together scan chain of four chiplets to create a single scan chain may increase the time to perform a single scan chain by at least four times. The increased scan chain time may cause significant delay in allowing the PMIC to perform voltage adjustment across the shared power rail, reducing overall power efficiency. For example, a single scan may indicate that a first chiplet of four chiplets may operate at a lower voltage, but the scanning process must continue until scanning of sensors of the remaining three chiplets is finished. During this timeframe, the first chiplet that could operate at a lower voltage may continue being supplied with excess voltage until the scan is completed and the PMIC is instructed to adjust the voltage across the shared power rial. As another example, a single scan may indicate that a first chiplet of four chiplets requires a higher voltage to operate without error, but the scanning process must continue until scanning of sensors of the remaining three chiplets is finished. During this timeframe, the first chiplet that needs an increase in supplied voltage may experience errors caused by insufficient voltage, and may lead to chiplet and/or system failure.

Various embodiments may improve operations of multiple-chiplet systems by treating each chiplet independently, providing separate scan chains and power controllers for each individual chiplet for each power rail. A master-slave chiplet configuration may reduce the amount of overhead and communications to the PMIC necessary to implement power adjustments to one or more power rails shared by the chiplets in a package.

In a system with multiple chiplets that share one or more power rails, one chiplet may be configured as a master chiplet, and the remaining chiplets may be configured as slave chiplets. Power controllers of each slave chiplet may perform scans for each chiplet power rail to determine whether any voltage micro-adjustments can be made (i.e., may operate a decreased voltage) or need to be made (i.e., needs increased voltage to operate without error). After determining that a voltage micro-adjustment may be performed by the PMIC, a slave chiplet may communicate a voltage change message to the master chiplet. A voltage change message may include a request for the PMIC to increase or decrease power rail voltage. In various embodiments, a voltage change message may indicate that no voltage micro-adjustment is required. Multiple slave chiplets may communicate voltage change messages to the master chiplet simultaneously or within an aggregation window of time. The master chiplet may receive the voltage change message(s) and aggregate the results from each scan chain, including its own scan chain, to determine what, if any, voltage micro-adjustments the PMIC may implement across a shared power rail. Based on the voltage change messages, the master chiplet may transmit a power rail adjustment message to the PMIC to instruct the PMIC to implement the requested voltage micro-adjustments.

In various embodiments, the master chiplet may implement an aggregation window, a vote table, or both an aggregation window and a vote table to determine when and how to aggregate system-wide voltage micro-adjustment requests for purposes of generating power rail adjustment messages. For example, a slave chiplet may request an increase in voltage based on a recent scan chain scan, and may send a voltage change message to the master chiplet. Requests for increases in voltage may be serviced immediately in which the master chiplet may generate and transmit a power rail adjustment message to the PMIC after receiving the voltage change message. As another example, a slave chiplet may request a decrease in voltage based on a recent scan chain scan, and may send a voltage change message to the master chiplet. The master chiplet may store the voltage change message and/or scan chain information from the voltage change message, and continue to wait for additional voltage change messages from other slave chiplets. At the end of an aggregation window or in response to a global vote table comparison, the master chiplet may generate and transmit a power rail adjustment message to the PMIC to effectuate voltage micro-adjustments for multiple chiplets.

Scan chains indicating the power rail voltage does not need to be adjusted may be filtered or otherwise ignored by the master chiplet.

By implementing a master-slave configuration, the master chiplet may act as a buffer, or "middle man" device, between the slave chiplets and the PMIC. This multiple-chiplet master-slave configuration may reduce the number of voltage change request messages transmitted to the PMIC, which may reduce overhead experienced by the PMIC and free up processes to more quickly implement voltage microadjustments.

FIG. 1 is a component block diagram illustrating an example multiple-chiplet system circuitry 100 suitable for implementing any of the various embodiments. The illustrated example multiple-chiplet system 100 includes four chiplets 110a, 110b, 110c, and 110d located within a single system package, or system-in-a-package (SIP) 104, a PMIC 102, and a controller-to-controller interface 108. The multiple-chiplet system 100 may further include an interface bus 106 (e.g., system power management interface (SPMI), inter-integrated circuit (VC) bus), an embedded memory (MX) power rail 118, and a core logic (CX) power rail 120. The chiplets 110a, 110b, 110c, and 110d may be used to perform operations according to various embodiments. However, any number of chiplets greater than or equal to two chiplets may be used to implement the various embodiments. For example, a two-chiplet system may be implemented with a first (i.e., primary/master) chiplet and a second chiplet (i.e., secondary/subsidiary/slave) chiplet. As another example, six chiplets may be implemented within the SIP 104 with one operating as a first (i.e., primary/master) chiplet and the remaining five chiplets operating as second (i.e., secondary/subsidiary/slave) chiplets. In some embodiments, the PMIC 102 may be located within the SIP 104.

In some embodiments, one or more of the chiplets 110a, 110b, 110c, and 110d may operate collectively as a central processing unit (CPU) of the multiple-chiplet system 100 that carries out the instructions of software application programs by performing the arithmetic, logical, control and input/output (I/O) operations specified by the instructions. In some embodiments, one or more of the chiplets 110a, 110b, 110c, and 110d may operate as a specialized processing unit. Each chiplet 110a, 110b, 110c, and 110d may include one or more cores, and each core may perform operations independent of the other cores within the same chiplet and cores within other chiplets. In addition, any or all of the chiplets 110a, 110b, 110c, and 110d may be included as part of a processor cluster architecture (e.g., a synchronous processor cluster architecture, an asynchronous or heterogeneous processor cluster architecture, etc.).

The chiplets 110a, 110b, 110c, and 110d may include various additional system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources of the chiplets 110a, 110b, 110c, and 110d may include power amplifiers, voltage regulators, oscillators, phase-locked loops, peripheral bridges, data controllers, memory controllers, system controllers, access ports, timers, and other similar components used to support the processors and software clients running within the SIP 104 and outside but in electrical communication with the SIP (e.g., PMIC 102) within the multiple-chiplet system 100. The system components and resources and/or custom circuitry may also include circuitry to interface with peripheral devices, such as cameras, electronic displays, wireless communication devices, external memory chips, etc. The chiplets 110a, 110b, 110c, and 110d may each further include input/output modules, in addition to the communication interfaces 114a, 114b, 114c, and 114d (labeled as "Interface", for communicating with resources external to the SIP, such as a clock or the PMIC 102. Resources external to the SIP may be shared by two or more of the chiplets 110a, 110b, 110c, and 110d.

The chiplets 110a, 110b, 110c, and 110d may include memory devices 122a, 122b, 122c, and 122d (labeled as Mem) that may be a volatile or non-volatile memory configured for storing data and processor-executable code for access by one or more processing cores 124a, 124b, 124c, and 124d (labeled as Proc) of each respective chiplet 110a, 110b, 110c, and 110d. In some embodiments, the communication interfaces 114a, 114b, 114c, and 114d may be implemented by portions of the one or more processing cores 124a, 124b, 124c, 124d. For example, the one or more processing cores 124a, 124b, 124c, 124d may include general purpose input/output (GPIO) pins or an internally hardwired communication interface that may be used to receive and transmit data messages to and from the PMIC and between other chiplet communication interfaces. In some embodiments, the communication interfaces 114a, 114b, 114c, and 114d may be programmable logic devise (PLDs) implemented externally to and in communication with the one or more processing cores 124a, 124b, 124c, 124d.

In addition to the memory devices 122a, 122b, 122c, and 122d, the multiple-chiplet system 100 may include one or more additional memory devices (not shown) located internally or externally to the SIP 104 that may configured for various purposes. One or more memory devices including the memory devices 122a, 122b, 122c, and 122d may include volatile memories such as random-access memory (RAM) or main memory, or cache memory. These memory devices may be configured to temporarily hold a limited amount of data received from a data sensor or subsystem, data, and/or processor-executable code instructions that are requested from non-volatile memory, loaded to the memory devices from non-volatile memory in anticipation of future access based on a variety of factors, and/or intermediary processing data and/or processor-executable code instructions produced by the chiplets 110a, 110b, 110c, and 110d and temporarily stored for future quick access without being stored in non-volatile memory. The memory devices 122a, 122b, 122c, and 122d of the multiple-chiplet system 100 may be configured to store data and processor-executable code, at least temporarily, that is loaded to the memory devices 122a, 122b, 122c, and 122d in each chiplet 110a, 110b, 110c, and 110d for access by one or more of the processing cores 124a, 124b, 124c, and 124d of the chiplets 110a, 110b, 110c, and 110d. The data or processor-executable code loaded to the memory devices 122a, 122b, 122c, and 122d in each chiplet 110a, 110b, 110c, and 110d may be loaded in response to execution of a function by the processing cores 124a, 124b, 124c, and 124d.

Each chiplet 110a, 110b, 110c, and 110d may include a power controller 112a, 112b, 112c, 112d (labeled as Ctrlr), a communication interface 114a, 114b, 114c, 114d and sensors 116a, 116b, 116c, 116d.

The sensors 116a, 116b, 116c, and 116d may be voltage sensors, power sensors, and/or temperature sensors configured to measure sensory parameters and provide sensor measurements to power controllers 112a, 112b, 112c, 112d respectively. The sensor(s) 116a may refer to one or more sensors electrically connected to the power controller 112a. Similarly, the sensors 116b, 116b, and 116d may each include one or more sensors. The sensors 116a, 116b, 116c, and 116 may be physically located throughout each respective chiplet 110a, 110b, 110c, and 110d die to gather sensory parameters regarding the operating status of each chiplet 110a, 110b, 110c, and 110d. The sensors 116a, 116b, 116c, and 116d may measure thermal and electrical characteristics (i.e., provide temperature and voltage information) throughout each respective chiplet 110a, 110b, 110c, and 110d during testing and normal operating processes. Temperature values, voltage values, and/or power values measured by the sensors 116a, 116b, 116c, and 116d may be conveyed to each respective power controller 112a, 112b, 112c, and 112d for processing, and may be relayed to one or more memory devices in each respective chiplet 110a, 110b, 110c, and 110d for storage.

The sensors 116a, 116b, 116c, and 116d may be organized in series, or a "daisy-chain" manner, within each respective chiplet 110a, 110b, 110c, and 110d die. The sensors 116a, 116b, 116c, and 116d may be connected in series with each respective power controller 112a, 112b, 112c, and 112d, such that measurements from each sensor and/or sensor chain may be collected by each respective power controller 112a, 112b, 112c, and 112d. For example, sensors 116a may provide sensory information regarding measurable conditions throughout the chiplet 110a die, with the series or chain connections relaying the collected sensory information to the power controller 112a for processing. This serial configuration may be referred to as a "scan chain," in which sensory information from each sensor within a scan chain is passed to and relayed on by a next sensor until the information is provided to a power controller (e.g., power controller 112a, 112b, 112c, and 112d) that may aggregate or otherwise organize the sensory information.

Each power controller 112a, 112b, 112c, and 112d may convey the collected sensory information to each respective communication interface 114a, 114b, 114c, and 114d. In some embodiments, each power controller 112a, 112b, 112c, and 112d may convey the collected sensory information to each respective communication interface 114a, 114b, 114c, and 114d directly. In some embodiments, each power controller 112a, 112b, 112c, and 112d may convey the collected sensory information to each respective communication interface 114a, 114b, 114c, and 114d in a packaged message, such as a voltage change message including the obtained sensory information.

In various embodiments, the power controllers 112a, 112b, 112c, and 112d may determine whether voltage micro-adjustments should be performed by the PMIC 102 based on the sensory information measured by the respective sensors 116a, 116b, 116c, and 116d. For example, the power controller 112a may determine that a memory block or core requires more voltage to operate efficiently and without error based on the sensory information measured by the sensors 116a. The power controller 112a may create and transmit a voltage adjustment message, or voltage change message, to the communication interface 114a, and the communication interface 114a may relay the voltage change message to the PMIC 102. The voltage change message may indicate what, if any, voltage micro-adjustments the PMIC 102 should perform across the MX power rail 118 and/or the CX power rail 120 to supply the power-demanding memory block and/or core within the chiplet 110a with adequate power. The power controllers 112b, 112c, and 112d may operate in a similar fashion, aggregating sensory data to develop voltage change messages to relay to the PMIC 102 to effectuate voltage micro-adjustments throughout the multiple-chiplet system 100.

Each communication interface 114a, 114b, 114c, and 114d may be configured to communicate sensory information gathered by the power controllers 112a, 112b, 112c, and 112d to the PMIC 102 across the interface bus 106. The communication interfaces 114a, 114b, 114c, and 114d may be configured to repackage the sensory information into a format suitable for communicating with the PMIC 102. For example, each communication interface 114a, 114b, 114c, and 114d may be configured to repackage any received voltage change messages, which include sensory information and/or a request to increase or decrease a voltage value, into power rail adjustment messages that may be transmitted to the PMIC 102. Each communication interface 114a, 114b, 114c, and 114d may be configured to communicate control information/messages/commands and sensory information to reciprocal communication interfaces 114a, 114b, 114c, and 114d via the interface bus 106 and additionally via the controller-to-controller interface 108. Thus, the chiplets 110a, 110b, 110c, and 110d may communicate with each other via the interface bus 106 and/or the controller-to-controller interface 108 depending on the function of the transmitted command or information.

The PMIC 102 may control or otherwise regulate various power rails used to power portions of each chiplet 110a, 110b, 110c, and 110d. For example, the PMIC 102 may supply power to memory devices or blocks of the chiplets 110a, 110b, 110c, and 110d through the MX power rail 118, and may supply power to processing cores of the chiplets 110a, 110b, 110c, and 110d through the CX power rail 120. As illustrated, the chiplets 110a, 110b, 110c, and 110d may share a same MX power rail 118 and CX power rail 120, in which the PMIC 102 may regulate the power supplied to memory blocks and cores of each chiplet 110a, 110b, 110c, and 110d individually.

The PMIC 102 may regulate the power supplied to each chiplet 110a, 110b, 110c, and 110d via the MX power rail 118 and the CX power rail 120 based on the sensory information gathered by sensors 116a, 116b, 116c, and 116d. Sensory information indicating that a portion of a specific chiplet requires more power to operate without error (e.g., high temperature caused by high current draw, high voltage utilization) may cause the PMIC 102 to supply more voltage across the MX power rail 118 and/or the CX power rail 120 accordingly. For example, voltage sensors of the sensors 116a may measure that a core of the chiplet 110a may have insufficient power to perform one or more operations. The PMIC 102 may receive this voltage information to increase the voltage supplied to that power-demanding core via the CX power rail 120. Sensory information indicating that a portion of a specific chiplet may utilize less power to operate may cause the PMIC 102 to supply less voltage across the MX power rail 118 and/or the CX power rail 120 accordingly. For example, based on sensory information that a memory device or core is inactive or has reduced activity (i.e., lower power consumption below a minimum operating requirement) the PMIC 102 may reduce power consumption by lowering the voltage supplied to inactive or less active memory devices and/or cores in the chiplet via the MX power rail 118 and/or the CX power rail 120 accordingly. Sensory information indicating that a portion of a specific chiplet is being supplied with adequate power not in excess of minimum operating requirements (i.e., within a power requirement threshold) may cause the PMIC 102 to make no adjustments to voltage being supplied to the chiplet across the MX power rail 118 and/or the CX power rail 120.

In various embodiments, one of the chiplets 110a, 110b, 110c, and 110d may be configured as a master chiplet, and the remaining chiplets may be configured as slave chiplets. For example, the chiplet 110a may be configured as a master chiplet, and the chiplets 110b, 110c, and 110d may be configured as slave chiplets controlled by the chiplet 110a. Unless otherwise specified, the following examples and embodiments are described using the non-limiting example of the chiplet 110a configured as the master chiplet, and the chiplets 110b, 110c, 110d configured as slave chiplets. Instead of conveying sensory information (i.e., packaged as voltage change messages) directly to the PMIC 102 across the interface bus 106, the slave chiplets 110b, 110c, and 110d, may communicate obtained sensory information to the communication interface 114a of the master chiplet 110a via the slave chiplet communication interfaces 114b, 114c, and 114d. Based on the voltage change messages received from the slave chiplet communication interfaces 114b, 114c, and 114d and the master chiplet power controller 112a, the master chiplet communication interface 114a may aggregate the total voltage change messages to determine which, if any, voltage micro-adjustments should be performed across the MX power rail 118 and the CX power rail 120. The master chiplet communication interface 114a may aggregate received voltage change messages, which may include obtained sensory information and/or indications to increase or decreased a voltage, to develop a power rail adjustment message. The master chiplet communication interface 114a may transmit the power rail adjustment message to the PMIC 102 over the interface bus 106 (e.g., SPMI, I$^2$C bus, etc.). The power rail adjustment message may include instructions for the PMIC 102 to make voltage micro-adjustments across the MX power rail 118 and/or the CX power rail 120 for each chiplet 110a, 110b, 110c, and 110d.

Each power controller 112a, 112b, 112c, and 112d may collect sensory information to determine whether any voltage micro-adjustments can be safely performed (i.e., lower the voltage level when power draw is at a reduced requirement) or need to be performed as soon as possible (i.e., more voltage is required to operate efficiently and without error). For example, the master chiplet power controller 112a may determine that a core of the master chiplet 110a requires more power, the slave chiplet power controller 112b may determine that less power can be provided to a memory block of the slave chiplet 110b without affecting performance, the slave chiplet power controller 112c may determine that voltage levels across either MX power rail 118 and CX power rail 120 do not need to be changed for the slave chiplet 110c, and the slave chiplet power controller 112d may determine that a core of the slave chiplet 110d may operate normally with less power and that a memory block of the slave chiplet 110d requires more power. Each power controller 112a, 112b, 112c, and 112d may generate voltage change messages that include at least an indication of increasing, decreasing, or not altering voltage supplied across the MX power rail 118 and/or the CX power rail 120. The voltage change messages may be transmitted to each respective communication interface 114a, 114b, 114c, and 114d, and the slave chiplet communication interfaces 114b, 114c, and 114d may transmit the voltage change messages to the master chiplet communication interface 114a. Based on all received voltage change messages, the master chiplet communication interface 114a may generate and transmit a power rail adjustment message to the PMIC 102 causing the PMIC 102 to perform the following according to the present example: (i) increase voltage to a core via the CX power rail 120 and make no voltage adjustments across the MX power rail 118 for the master chiplet 110a; (ii) reduce voltage to a memory block via the MX power rail 118 and make no adjustments across the CX power rail 120 for the slave chiplet 110b; (iii) make no adjustments across the MX power rail 118 or the CX power rail 120 for the slave chiplet 110c; and (iv) decrease voltage to a core via the CX power rail 120 and increase voltage to a memory block via the MX power rail 118 for the slave chiplet 110d.

In some embodiments, voltage change messages generated by slave chiplet power controllers 112b, 112c, 112d and relayed to the slave chiplet communication interfaces 114b, 114c, 114d may be transmitted to the master chiplet communication interface 114a as soon as the voltage change messages are generated. For example, a slave chiplet power controller 112b may determine that a voltage micro-adjustment can be performed or is required and proceeds to generate a voltage change message. Simultaneously, slave chiplet power controllers 112c and 112d may still be processing sensory information to determine whether any voltage micro-adjustments may be performed for that respective chiplet. Independent of the processes of other slave chiplets, the slave chiplet communication interface 114b relay the may relay the voltage change message from the slave chiplet power controller 112b to the master chiplet communication interface 114a. Assuming the voltage change message from the slave chiplet power controller 112b is requesting a voltage increase (i.e., more voltage is required to prevent errors and/or system failure) across any power rail, the master chiplet communication interface 114a may immediately generate and transmit to the PMIC 102 a power rail adjustment message based on the slave chiplet power controller 112b voltage change message regardless of whether the master chiplet power controller 112a has generated its own voltage change message or received new voltage change messages from the slave chiplet communication interfaces 114c and 114d. This may allow a chiplet demanding an increase in voltage to receive the increased voltage as soon as possible.

In some embodiments, the interface bus 106 (e.g., SPMI bus) may be configured to allow the slave chiplet communication interfaces 114b, 114c, 114d, in addition to the master chiplet communication interface 114a, to communicate directly with the PMIC 102. The slave chiplet communication interfaces 114b, 114c, 114d may generate and transmit power rail adjustment messages to the PMIC 102 over the interface bus 106 in a similar manner as the master chiplet communication interface 114a. This may allow the slave chiplet communication interfaces 114b, 114c, 114d to cause the PMIC 102 to perform voltage micro-adjustments across independent, non-shared, power rails for each slave chiplet 110b, 110c, 110d. Thus, the PMIC 102 may receive multiple power rail adjustment messages from the master chiplet communication interface 114a and the slave chiplet communication interfaces 114b, 114c, 114d. The PMIC 102 may receive power rail adjustment messages (i.e., shared power rail adjustment messages) from the master chiplet communication interface 114a that may command the PMIC 102 to perform voltage micro-adjustments across one or more power rails shared by the master chiplet 110a and at least one of the slave chiplets 110b, 110c, 110d. Additionally, the PMIC 102 may receive power rail adjustment messages (i.e., independent power rail adjustment messages) from the slave chiplet communication interfaces 114b, 114c, 114d that may inform or command the PMIC 102 to perform voltage micro-adjustments across one or more independent power rails of the slave chiplets 110b, 110c, 110d. For example, the slave chiplet power controller 112b may generate a voltage change message based on sensory parameters corresponding to an independent power rail utilized only by the slave chiplet 110b, and may transmit the voltage change message to the slave chiplet communication interface 114b. The slave chiplet communication interfaces 114b may generate and transmit an independent power rail adjustment message to the PMIC 102 to prompt or cause the PMIC 102 to adjust a voltage of the independent power rail utilized only by the slave chiplet 110b. Similarly, the PMIC 102 may receive power rail adjustment messages (i.e., independent power rail adjustment messages) from the master chiplet communication interface 114a that may command the PMIC 102 to perform voltage micro-adjustments across one or more independent power rails of the master chiplet 110a.

In some embodiments, the master chiplet communication interface 114a may aggregate voltage change messages corresponding to independent, non-shared, power rails of the master chiplet 110a and the slave chiplets 110b, 110c, 110d, in addition to voltage change messages corresponding to power rails shared by the master chiplet 110a and the slave chiplets 110b, 110c, 110d. The slave chiplet power controllers 112b, 112c, 112d may generate voltage change messages corresponding to independent, non-shared, power rails, and transmit the voltage change messages corresponding to independent power rails to the slave chiplet communication interfaces 114b, 114c, 114d. The slave chiplet communication interfaces 114b, 114c, 114d may transmit the voltage changes messages to the master chiplet communication interface 114a. The master chiplet communication interface 114a may generate one or more power rail adjustment messages based on the voltage change messages corresponding to independent power rails. The master chiplet communication interface 114a may transmit the power rail adjustment message(s) to the PMIC 102 to cause the PMIC to adjust an independent power rail of at least one of the master chiplet 110a, and the slave chiplets 110b, 110c, 110d.

In some embodiments, a voltage change message may include sensory information corresponding to a voltage change for both a shared power rail and an independent power rail. For example, the slave chiplet power controller 112b may generate a voltage change message based on sensory parameters corresponding to a shared power rail and an independent power rail. Thus, a single power rail adjustment message transmitted by the master chiplet 110a or the slave chiplets 110b, 110c, 110d to the PMIC 102 may cause the PMIC 102 to perform voltage micro-adjustments for a shared power rail and at least one independent power rail. Therefore, in embodiments in which the master chiplet communication interface 114a aggregates voltage change messages received from slave chiplet communication interfaces 114b, 114c, 114d, the master chiplet communication interface 114a may generate a single power rail adjustment message that may include at least one of the following instructions to the PMIC 102: (i) adjust a voltage of a power rail shared by at least two of the master chiplet 110a and slave chiplets 110b, 110c, 110d; (ii) adjust a voltage of an independent power rail utilized only by the master chiplet 110a; (iii) adjust a voltage of an independent power rail utilized only by the slave chiplet 110b; (iv) adjust a voltage of an independent power rail utilized only by the slave chiplet 110c; and (v) adjust a voltage of an independent power rail utilized only by the slave chiplet 110d.

In some embodiments, the master chiplet communication interface 114a may wait a predetermined period, or aggregation window, after receiving a voltage change message (e.g., from slave chiplet communication interface 114b) requesting an increase in voltage across any power rail, such that the master chiplet communication interface 114a may be able to receive additional voltage change messages (e.g., from the master chiplet power controller 112a and/or slave chiplet communication interfaces 114c, 114d) to include in the power rail adjustment message. Assuming the voltage change message from the slave chiplet communication interface 114b is requesting a voltage decrease and not a voltage increase across any power rail, the master chiplet communication interface 114a may wait a predetermined period after receiving the voltage change message, enabling the master chiplet communication interface 114a to receive additional voltage change messages to include in the power rail adjustment message while waiting for other power controllers (e.g., power controllers 112a, 112c, 112d) to determine whether any additional voltage micro-adjustments may or should be performed.

Configuring one chiplet as a master chiplet and remaining chiplets as corresponding slave chiplets may allow the master chiplet to operate as a buffer between the PMIC 102 and any slave chiplets. A single master chiplet communicating with the PMIC 102 may reduce or otherwise limit the number of control and information messages relayed across the interface bus 106 as compared with a multi-chiplet system in which all chiplets communicate voltage change messages with the PMIC 102. Thus, a master-slave chiplet configuration in which one chiplet aggregates voltage change messages and generates a single power rail adjustment message to the PMIC may reduce the computation resources, and therefore total power consumption, needed to efficiently power the SIP 104 within the multiple-chiplet system 100.

In some embodiments, a multiple-chiplet master-slave configuration may be merged with non-chiplet design configurations. For example, a multiple-chiplet system such as multiple-chiplet system circuitry 100 may be manufactured and merged with non-chiplet hardware components and/or hardware functional blocks. The non-chiplet hardware components and/or hardware functional blocks may include power rails that may be merged with or otherwise electrically connected to the power rails of the multiple-chiplet system circuitry 100. Thus, the power rail voltage values of the merged non-chiplet hardware components and/or hardware functional blocks may be adjusted by the multiple-chiplet system circuitry 100 in a similar manner as the master chiplet 110a adjusting power rail voltage values of the slave chiplets 110b, 110c, 110d.

Figure 2:
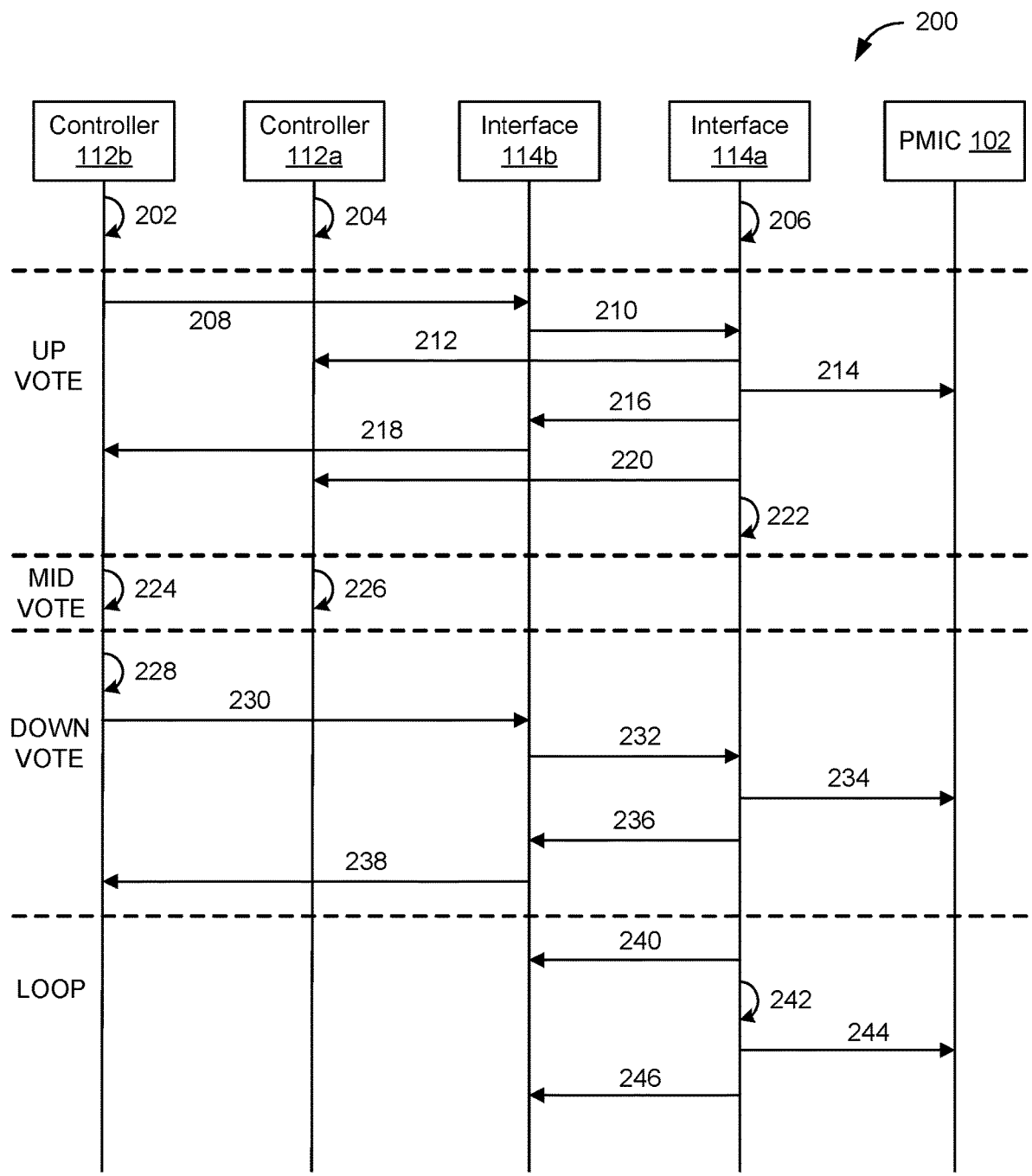
FIG. 2 is message flow diagram illustrating operations and device-to-device communications for managing power within a multiple-chiplet system utilizing an aggregation window according to some embodiments.
Figure 3:
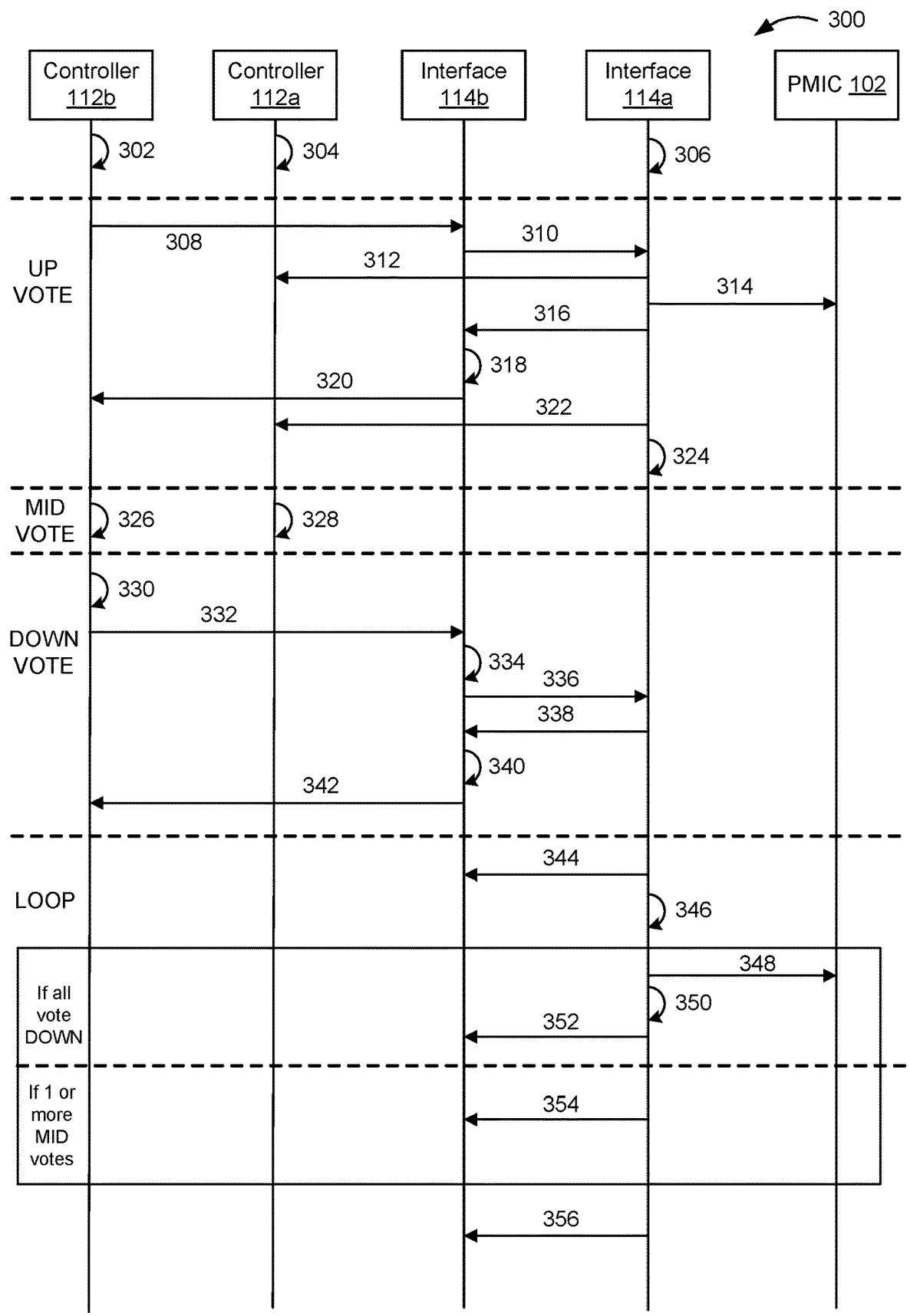
FIG. 3 is message flow diagram illustrating operations and device-to-device communications for managing power within a multiple-chiplet system utilizing an aggregation window and vote table according to some embodiments.
Figure 4:
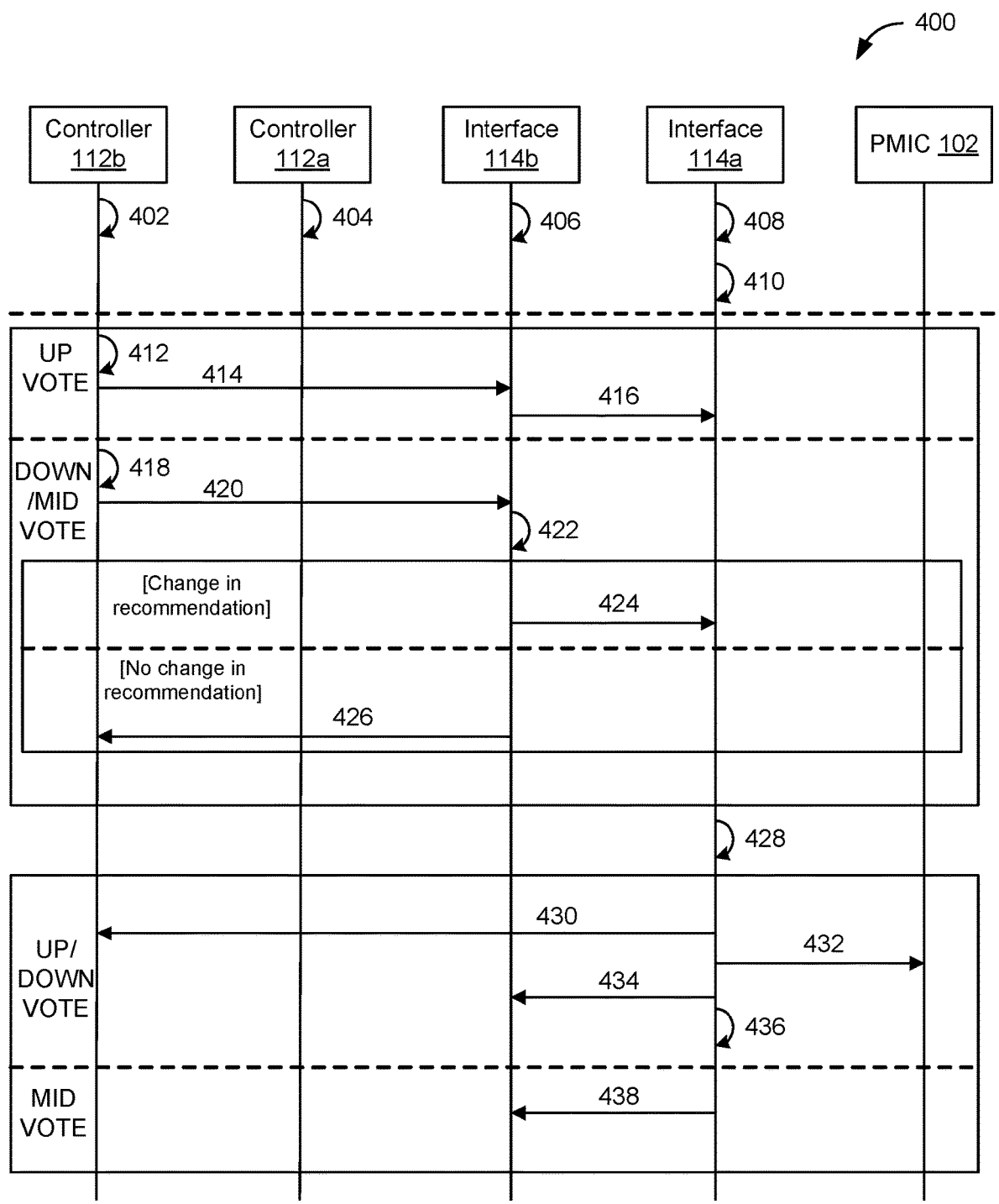
FIG. 4 is message flow diagram illustrating operations and device-to-device communications for managing power within a multiple-chiplet system utilizing a vote table according to some embodiments.

FIGS. 2-4 are message flow diagrams 200, 300, and 400 illustrating operations and device-to-device communications for managing power within a multiple-chiplet system according to some embodiments. The operations and communications for managing power within a multiple-chiplet system illustrated in FIGS. 2-4 may be implemented using at least two chiplets (e.g., chiplets 110a, 110b, 110c, 110d) and a PMIC (e.g., PMIC 102) communicably connected via an interface bus (e.g., interface bus 106). Some of the operations or communications illustrated in FIGS. 2-4 may not be performed in all embodiments, and operations and communications may be performed in a different order than the examples shown in FIGS. 2-4.

Referring to FIGS. 2-4, a master chiplet 110a having a master chiplet power controller 112a and a master chiplet communication interface 114a may communicate with a slave chiplet 110b having a slave chiplet power controller 112b and a slave chiplet communication interface 114b. The master chiplet communication interface 114a of the master chiplet 110a may communicate with the slave chiplet communication interface 114b and the PMIC 102, such that the master chiplet communication interface 114a functions as a communications buffer between the slave chiplet communication interface 114b and the PMIC 102. The master chiplet power controller 112a may communicate sensory information (e.g., power usage/utilization, voltage, temperature, current) regarding the master chiplet 110a to the master chiplet communication interface 114a. The slave chiplet power controller 112b may communicate sensory information regarding the slave chiplet 110b to the slave chiplet communication interface 114b. The master chiplet communication interface 114a may generate and transmit power rail adjustment messages to the PMIC 102 to cause the PMIC 102 to perform voltage micro-adjustments across MX and CX power rails (e.g., MX power rail 118, CX power rail 120).

FIGS. 2-4 illustrate various scenarios for when the slave chiplet power controller 112b determines, that a voltage micro-adjustment (i) needs to be performed as soon as possible (e.g., voltage must be increased to operate efficiently and without error), (ii) can be performed (i.e., voltage may be decreased when power draw is at a reduced requirement), or (iii) does not need to be performed (e.g., voltage is sufficient and not in excess of operating requirements). These various scenarios are separated by dashed lines as illustrated, and are respectively designated by labels (i) "UP VOTE" (i.e., chiplet needs more power), (ii) "DOWN VOTE" (i.e., chiplet may operate with less power), and (iii) "MID VOTE" (i.e., voltage is sufficient and not in excess of operating requirements and therefore no voltage micro-adjustment should be performed). A "vote" may also be referred to as an "interrupt." The various operations and communications designated to each scenario may be performed when the slave chiplet power controller 112b indicates a request for increased voltage, decreased voltage, or no change in voltage. For example, with reference to FIG. 2, the slave chiplet power controller 112b may transmit an up vote indicating a request for increased voltage, and the operations and communications 208-222 may be performed. Similarly, the slave chiplet power controller 112b may transmit a down vote indicating a request for decreased voltage, and the operations and communications 228-238 may be performed. As another example, with reference to FIG. 4, operations and communications 412-418 and 428-438 may be performed when the slave chiplet power controller 112b may transmit an up vote indicating a request for increased voltage.

FIG. 2 is message flow diagram 200 illustrating operations and device-to-device communications for managing power within a multiple-chiplet system utilizing an aggregation window according to some embodiments. In overview of the embodiment illustrated in FIG. 2, a master chiplet communication interface 114a may receive one request (e.g., up vote, down vote, mid vote) from each slave chiplet communication interface (e.g., slave chiplet communication interface 114b). For example, the master chiplet communication interface 114a of the master chiplet 110a may receive an up vote, down vote, or mid vote from the slave chiplet communication interface 114b of the slave chiplet 110b. An aggregation window may be implemented during which the master chiplet communication interface 114a may receive votes from the slave chiplet communication interface 114b. An aggregation window may be defined as the timeframe during which a master chiplet communication interface 114a receives any voltage change messages from the slave chiplet communication interface 114b and any other slave chiplet communication interfaces (e.g., slave chiplet communication interfaces 114c, 114d), aggregates voltage change messages to generate a power rail adjustment message, transmits the power rail adjustment message to the PMIC 102, and then initiates a new aggregation window. At the beginning of the aggregation window, the master chiplet power controller 112a may begin aggregating sensory information from its sensors to determine whether a voltage micro-adjustment should be performed on the master chiplet 110a power rails. After the master chiplet power controller 112a transmits the recommendation, or voltage change message (i.e., up/mid/down vote), to the master chiplet communication interface 114a, the master chiplet power controller 112a may wait until the master chiplet communication interface 114a finishes aggregating the voltage change message and any other voltage change messages received from the slave chiplet communication interface 114b. Once the aggregation window ends and/or the master chiplet communication interface 114a transmits a power rail adjustment message to the PMIC 102, a new aggregation window may be initiated and the master chiplet power controller 112a may repeat the process of aggregating sensory information.

Generally, the operations and communications in the embodiment illustrated in FIG. 2 may implement the following rules: up votes are immediately serviced to avoid functional failures; mid votes are ignored as they don't necessitate any voltage micro-adjustments; and down votes are considered with hysteresis and aggregated sparsely to reduce the overall load on master chiplet communication interface 114a and slave chiplet communication interface 114b. The overarching methodologies of FIG. 2 may be represented by the following high-level algorithm:

For each (aggregation window)
If (power controller recommends UP vote)
increase the voltage to UP and start new aggregation window
else (power controller recommends DOWN vote)
aggregate votes from all chiplets at the end of aggregation window and take necessary action
else (power controller recommends MID vote)
ignore the vote start new aggregation window after previous window expires
start new aggregation window after previous window expires.

Referring to FIG. 2, in operations 202 and 204, counters within the master chiplet power controller 112a and slave chiplet power controller 112b may be set to predetermined counter values in preparation of a newly initiated aggregation window. Counters may be preset and/or may be configurable by the master chiplet power controller 112a and the slave chiplet power controller 112b before each new aggregation window. Counters may be set or preset for each voting type. For example, an up vote counter such as CONSEQUTIVE_UP may be set to a value of 0 (i.e., no wait time once the power controller recommends a voltage increase so that power demands are met as soon as possible), a mid vote counter such as CONSEQUTIVE_MID may be set to 14, and a down vote counter such as CONSEQUTIVE_DN may be set to 14. The counter values may determine how long a power controller may wait before sending a voltage change message, if any, to the corresponding communication interface within a chiplet. During the counter wait times, the power controllers may continue to receive and aggregate sensory information from the corresponding scan chain sensors. In some embodiments, an up vote counter may be set to a value other than 0, such that up votes are not immediately serviced, and may instead allow a power controller to wait a small period (e.g., counter value 3) to aggregate additional sensory information related to an up vote (i.e., recommend to perform a larger voltage micro-adjustment).

The various counters may be used to minimize total transmissions from power controllers (e.g., 112a, 112b, 112c, 112d) to their respective communication interfaces (e.g., 114a, 114b, 114c, 114d), as opposed to transmitting a mid vote or down vote upon completion of every power controller sensory information scan (e.g., every 30 microseconds). By waiting for and aggregating down votes and mid votes, which are not high priority as are up votes, the number of communications and operations performed by and the number of interrupts experienced by the communication interfaces (e.g., 114a, 114b, 114c, 114d) may be reduced (i.e., voltage change messages are held in a waiting period instead of being automatically transmitted to the communication interfaces after every sensory information scan). Thus, implementing wait time counters and an aggregation window may allow the voltage change messages to be transmitted in intervals to the slave chiplet communication interfaces and ultimately to the master chiplet communication interface, therefore reducing the overhead and computational resources used.

In operation 206, a time value may be set by the master chiplet communication interface 114a for the aggregation window duration. The aggregation window time value set within the master chiplet communication interface 114a may determine the duration of each aggregation window, during which operations and communications 208-246 may be performed. In one embodiment, the aggregation window time value may be a value (e.g., 3 ms) that is longer than a period for a power controller to increment a down vote or mid vote counter to its maximum counter value (e.g., 14). Expiration of the aggregation window time value may cause the master chiplet communication interface 114a to perform operations and communications 242-246.

In communication 208, the slave chiplet power controller 112b may transmit an up vote recommendation (i.e., a voltage change message) to the slave chiplet communication interface 114b. An up vote recommendation may be transmitted when the slave chiplet power controller 112b performs an iteration of sensing (e.g., via sensors 116b) and determines that one or more portions of the slave chiplet 110b requires more power to operate efficiently and without error. The duration of one iteration of measuring and aggregating sensory information by a power controller may depend on the number of sensors and the physical length of the scan chain. For example, a full scan initiated and then aggregated by a power controller make take 30 microseconds.

In communication 210, the slave chiplet communication interface 114b may transmit an up vote recommendation (i.e., a voltage change message) to the master chiplet communication interface 114a.

In communication 212, the master chiplet communication interface 114a may transmit a message to the master chiplet power controller 112a to stop further scan chain measurements until the end of the aggregation window. The message may include a bit, instruction, and/or command to set a certificate signing request (CSR) bit of the master chiplet power controller 112a to stop aggregating additional sensory information for the remaining duration of the present aggregation window.

In communication 214, the master chiplet communication interface 114a may generate and transmit a power rail adjustment message to the PMIC 102. The power rail adjustment message, based on the up vote recommendation, may instruct the PMIC 102 to increase voltage to an MX and/or CX power rail shared by the master chiplet 110a and the slave chiplet 110b.

In communication 216, the master chiplet communication interface 114a may transmit an acknowledgement message to the slave chiplet communication interface 114b. The acknowledgement message may include information indicating the voltage micro-adjustment performed or to be performed by the PMIC 102 in response to the communication 214. The acknowledgement message received by the slave chiplet communication interface 114b may indicate that an up vote has been immediately serviced and that the slave chiplet power controller 112b should begin a new iteration of sensory information scans in preparation of a next aggregation window.

In communication 218, the slave chiplet communication interface 114b may transmit a message to the slave chiplet power controller 112b instructing the slave chiplet power controller 112b to reinitiate scanning sensory information. The communication 218 may be transmitted in response to the acknowledgment message received in communication 216. The sensory information scanned by the slave chiplet power controller 112b may be used by the slave chiplet power controller 112b to determine what, if any, voltage micro-adjustments may be performed during the following aggregation window.

In communication 220, the master chiplet communication interface 114a may transmit a message to the master chiplet power controller 112a instructing the master chiplet power controller 112a to continue further scan chain measurements. The message may include a bit, instruction, and/or command to reset the CSR bit of the master chiplet power controller 112a to reinitiate aggregating additional sensory information. The sensory information scanned by the master chiplet power controller 112a may be used by the master chiplet power controller 112a to determine what, if any, voltage micro-adjustments may be performed during the following aggregation window.

In operation 222, the master chiplet communication interface 114a may begin a new aggregation window. The time value of the aggregation window may be reset to 0 by the master chiplet communication interface 114a assuming the aggregation window did not yet expire. For example, the aggregation window time value may be 3 ms, and the up vote recommendation according to operations and communications 208-220 may have been performed within 0.5 ms after the present aggregation window began. Thus, 0.5 ms into the present aggregation window, a new aggregation window may begin and the timer of the aggregation window may be reset to 0.

In operations 224 and 226, the master chiplet power controller 112a and the slave chiplet power controller 112b may perform no actions in response to a determination of a mid vote recommendation. The master chiplet power controller 112a and the slave chiplet power controller 112b may determine that no voltage micro-adjustments should be performed, such that each chiplet is being supplied with an adequate amount of power to operate normally without error. As a mid vote requires no change in voltage applied to each chiplet, mid vote recommendations by power controllers may be ignored, therefore reducing communications to the corresponding communication interfaces. A power controller may continue with a next scan chain measurement following a mid vote recommendation. For each mid vote recommendation by the slave chiplet power controller 112b, the mid vote counter (e.g., CONSECUTIVE_MID) may be incremented by the slave chiplet power controller 112b. For each mid vote recommendation by the master chiplet power controller 112a, the mid vote counter may be incremented by the master chiplet power controller 112a. When the mid vote counter reaches its preset value (e.g., 14), the power controller may enter a timeout status and may stop aggregating sensory information until a new aggregation window begins.

In operation 228, the slave chiplet power controller 112b may increment a down vote counter in response to determining, based on aggregated sensory information, that portions of the slave chiplet 110b may perform adequately at a reduced voltage level. The down vote counter (e.g., CONSEQUTIVE_DN) may be incremented by the slave chiplet power controller 112b, and the slave chiplet power controller 112b may scan a next iteration of sensory information from the scan chain.

In communication 230, the slave chiplet power controller 112b may transmit a down vote recommendation (i.e., voltage change message) to the slave chiplet communication interface 114b in response to determining that the down vote counter has been incremented to its preset value (e.g., 14). The down vote counter may be implemented by the slave chiplet power controller 112b to ensure that a recommendation to reduce voltage across an MX or CX power rail is consistent and may be performed without risk of reducing the supplied power below a sufficient operating level. In some embodiments, the down vote counter may count the total down votes despite being interrupted by one or more mid votes. For example, if the down vote counter increments 8 times, is interrupted by a mid vote, and proceeds to record 6 more downvotes to reach a down vote counter value of 14, then the slave chiplet power controller 112b may transmit the downvote recommendation to the slave chiplet communication interface 114b. In some embodiments, the down vote counter may be reset by the slave chiplet power controller 112b when interrupted by a mid vote. For example, if the slave chiplet power controller 112b increments a mid vote before reaching the down vote counter value (e.g., 14), the down vote counter may be reset to zero. Thus, a consecutive number of down votes may be required before making a down vote recommendation.

In communication 232, the slave chiplet communication interface 114b may transmit a down vote recommendation (i.e., a voltage change message) to the master chiplet communication interface 114a. After transmitting the down vote recommendation, the slave chiplet communication interface may wait to receive an acknowledgement (e.g., ack/nack) response from the master chiplet communication interface 114a before proceeding to some further operations, such as beginning a next sensory information measurement cycle.

In communication 234, the master chiplet communication interface 114a may generate and transmit a power rail adjustment message to the PMIC 102. The power rail adjustment message, based on the down vote recommendation, may instruct the PMIC 102 to decrease voltage to an MX and/or CX power rail shared by the master chiplet 110a and the slave chiplet 110b. The master chiplet communication interface 114a may transmit the power rail adjustment message in response to (i) all chiplets recommending a down vote, or (ii) the expiration of the aggregation window (i.e., see operations and communications 240-246). If all chiplets recommend a downvote, the master chiplet communication interface may transmit the power rail adjustment message to the PMIC 102 to perform voltage micro-adjustments before the expiration of the aggregation window.

In communication 236, the master chiplet communication interface 114a may transmit an acknowledgement (e.g., ack/nack) message to the slave chiplet communication interface 114b. The acknowledgement message may include information indicating the voltage micro-adjustment performed or to be performed by the PMIC 102 in response to the communication 234. The acknowledgement message received by the slave chiplet communication interface 114b may indicate that a down vote has been serviced and that the slave chiplet power controller 112b should begin a new iteration of sensory information scans in preparation of a next aggregation window.

In communication 238, the slave chiplet communication interface 114b may transmit a message to the slave chiplet power controller 112b instructing the slave chiplet power controller 112b to reinitiate scanning sensory information. The communication 238 may be transmitted in response to the acknowledgment message received in communication 236. The sensory information scanned by the slave chiplet power controller 112b may be used by the slave chiplet power controller 112b to determine what, if any, voltage micro-adjustments may be performed during the following aggregation window.

Operation 242 and communications 240, 244, and 246 may be performed by the master chiplet communication interface 114a upon expiration of the aggregation window. Assuming no up vote recommendations have been made, an aggregation window may expire when its timer reaches the preset aggregation window time value (e.g., 3 ms).

In communication 240, the master chiplet communication interface 114a may transmit a message to the slave chiplet communication interface 114b to stop further scan chain measurements and vote aggregation processes until the end of the aggregation window. The master chiplet communication interface 114a may transmit the message to the slave chiplet communication interface 114b if the slave chiplet communication interface 114b did not transmit a down vote recommendation (i.e., via operations and communication 228-238) to the master chiplet communication interface 114a before the end of the aggregation window. The message may include a bit, instruction, and/or command to set a CSR bit of the slave chiplet communication interface 114b to stop sensory information and vote aggregation processes until further instruction (i.e., communication 246).

In operation 242, the master chiplet communication interface 114a may aggregate vote recommendations received from slave chiplet communication interfaces and the master chiplet power controller 112a. For reference to communication 244, chiplets recommending a down vote may be considered voting chiplets, and chiplets recommending a mid vote or no recommendation (i.e., have not yet processed a vote type by the expiration of the aggregation window) may be considered non-voting chiplets.

In communication 244, the master chiplet communication interface 114a may generate and transmit a power rail adjustment message to the PMIC 102. The power rail adjustment message may instruct the PMIC 102 to decrease voltage to an MX and/or CX power rail shared by the master chiplet 110a and the slave chiplet 110b. The master chiplet communication interface 114a may transmit the power rail adjustment message in response to all voting chiplets recommending a down vote. If all voting chiplets recommend a downvote, the master chiplet communication interface 114a may transmit the power rail adjustment message to the PMIC 102 to perform voltage micro-adjustments. For example, the slave chiplet communication interface 114b may not have recommended a vote by the end of the aggregation window, but the master chiplet power controller 112a may have recommended a down vote. The master chiplet communication interface 114a may aggregate available votes (e.g., down vote from master chiplet power controller 112a) in operation 242 to then generate the power rail adjustment message including instructions to reduce voltage across the MX and/or CX power rails.

As another example, the slave chiplet communication interface 114b may have recommended a down vote, and the master chiplet power controller 112a may have recommended a mid vote. In that case, the master chiplet communication interface 114a may aggregate available votes (e.g., down vote from slave chiplet communication interface 114b) in operation 242 to then generate the power rail adjustment message including instructions to reduce voltage across the MX and/or CX power rails. If there are no voting chiplets upon expiration of the aggregation window, no power rail adjustment message may be generated or transmitted to the PMIC 102, and the process flow may continue to communication 246.

In communication 246, the master chiplet communication interface 114a may transmit a reset message to the slave chiplet communication interface 114b. The reset message may include a bit, instruction, and/or command to reset the CSR bit of the slave chiplet power controller 112b to reinitiate aggregating additional sensory information. The sensory information scanned by the slave chiplet power controller 112b may be used by the slave chiplet power controller 112b to determine what, if any, voltage micro-adjustments may be performed during the following aggregation window. The reset message may be an acknowledgement (e.g., ack/nack) message that may include information indicating the voltage micro-adjustment performed or to be performed by the PMIC 102 in response to the communication 244. The acknowledgement message received by the slave chiplet communication interface 114b may indicate that a down vote has been serviced and that the slave chiplet power controller 112b should begin a new iteration of sensory information scans in preparation of a next aggregation window. The reset message may include a bit, instructions, or command to instruct the slave chiplet communication interface 114b to reset the down vote counter and mid vote counter to 0 in preparation of the next aggregation window.

Following communication 246, a new aggregation window may be initiated by the master chiplet communication interface 114a and the operations and communications 202-246 may be repeated accordingly.

The operations and communications illustrated FIG. 2 may be performed in an order different than shown in the figure. For example, the operations 224 and 226 may be performed in any order before communication 208. As another example, the communication 216 may occur before communication 214.

For ease of illustration, operations of and communications between two chiplets (e.g., chiplets 110a, 110b) is shown. However, the same steps performed by or in conjunction with 110b may be simultaneously performed by additional chiplets that are in electrical communication (e.g., 110c, 110d) to the master chiplet 110a. For example, communication 216 may be transmitted to chiplets 110b, 110c, and 110d in response to an up vote recommendation made by the slave chiplet communication interface 114c. As another example, the master chiplet communication interface 114a may transmit a power rail adjustment message according to communication 234 when the master chiplet power controller 112a recommends a down vote and the slave chiplet communication interfaces 114b, 114c, and 114d all recommend a down vote according to communication 232.

FIG. 3 is message flow diagram 300 illustrating operations and device-to-device communications for managing power within a multiple-chiplet system utilizing an aggregation window and vote table according to some embodiments. The processes described with reference to FIG. 3 may reduce interrupts.

In the embodiment illustrated in FIG. 3, a vote table may be utilized by each chiplet and for each rail, the results of which may be used by the master chiplet communication interface 114a to generate a power rail adjustment message. Vote tables may be used by a slave chiplet (e.g., slave chiplets 110b, 110c. 110d) to store the latest recommendation (e.g., mid vote, down vote) to compare with the recommendation in the previous aggregation window. The slave chiplet communication interface 114b may send an interrupt (i.e., voltage change message) to the master chiplet communication interface 114a if the present vote in the slave chiplet vote table stored by the slave chiplet communication interface 114b differs from the vote type in the previous aggregation window. At every aggregation window, the master chiplet communication interface 114a may aggregate the vote tables and transmit the power rail adjustment message to the PMIC. Thus, the vote tables may be used as a buffer between the slave chiplet communication interface 114b and the master chiplet communication interface 114a to optimize master-slave communications by reducing the total amount of transmissions and interrupts to the master chiplet communication interface 114a. Each slave chiplet communication interface 114b, 114c, 114d may have a local vote table for storing a vote status (e.g., UP/DOWN/MID) from a last aggregation window. A master chiplet communication interface 114a may store a separate vote table for storing a vote status of each subservient slave chiplet communication interface 114b, 114c, 114d.

Generally, the operations and communications in the embodiment illustrated in FIG. 3 may implement the following rules: up votes are immediately serviced to avoid functional failures; and vote tables implemented by slave chiplet communication interfaces 114b, 114c, 114d store a latest mid/down vote to compare with previous recommendation and transmit interrupts to the master chiplet communication interface 114a only when there is change. The overarching methodologies of FIG. 3 may be represented by the following high-level algorithm:

For each (aggregation window)
  If (power controller recommends UP vote)
   increase the voltage to UP and start new aggregation window
  else (power controller recommends DOWN/MID vote)
   check against previous vote and send interrupt only if there is a change
   aggregate votes from all chiplets at the end of aggregation window and take necessary action
  start new aggregation window after previous window expires.

Referring to FIG. 3, in operations 302 and 304, counters within the master chiplet power controller 112a and slave chiplet power controller 112b may be set to predetermined counter values in preparation of a newly initiated aggregation window. Counters may be preset and/or may be configurable by the master chiplet power controller 112a and the slave chiplet power controller 112b before each new aggregation window. Counters may be set or preset for each voting type. For example, an up vote counter such as CONSEQUTIVE_UP may be set to a value of 0 (i.e., no wait time once the power controller recommends a voltage increase so that power demands are met as soon as possible), a mid vote counter such as CONSEQUTIVE_MID may be set to 14, and a down vote counter such as CONSEQUTIVE_DN may be set to 14. The counter values may determine how long a power controller may wait before sending a voltage change message, if any, to the corresponding communication interface within a chiplet. During the counter wait times, the power controllers may continue to receive and aggregate sensory information from the corresponding scan chain sensors. In some embodiments, an up vote counter may be set to a value other than 0, such that up votes are not immediately serviced, and may instead allow a power controller to wait a small period (e.g., counter value 3) to aggregate additional sensory information related to an up vote (i.e., recommend to perform a larger voltage micro-adjustment).

The various counters may be used to minimize total transmissions from power controllers (e.g., 112a, 112b, 112c, 112d) to their respective communication interfaces (e.g., 114a, 114b, 114c, 114d), as opposed to transmitting a mid vote or down vote upon completion of every power controller sensory information scan (e.g., every 30 microseconds). By waiting for and aggregating down votes and mid votes, which are not high priority as are up votes, the number of communications and operations performed by and the number of interrupts experienced by the communication interfaces (e.g., 114a, 114b, 114c, 114d) may be reduced (i.e., voltage change messages are held in a waiting period instead of being automatically transmitted to the communication interfaces after every sensory information scan). Thus, implementing wait time counters and an aggregation window may allow the voltage change messages to be transmitted in intervals to the slave chiplet communication interfaces and ultimately to the master chiplet communication interface, therefore reducing the overhead and computational resources used.

In operation 306, a time value may be set for the aggregation window duration and a vote table may be initiated by the master chiplet communication interface 114a. The aggregation window time value set within the master chiplet communication interface 114a may determine the duration of each aggregation window, during which operations and communications 308-356 may be performed. In one embodiment, the aggregation window time value may be a value (e.g., 3 ms) that is longer than a period for a power controller to increment a down vote or mid vote counter to its maximum counter value (e.g., 14). Expiration of the aggregation window time value may cause the master chiplet communication interface 114a to perform operations and communications 344-356. The master chiplet communication interface 114a may initialize a vote table and set each slave chiplet recommendation to mid vote. For example, the vote table stored by the master chiplet communication interface 114a may assign an initial value of "MID" to the slave chiplet 110b.

In communication 308, the slave chiplet power controller 112b may transmit an up vote recommendation (i.e., a voltage change message) to the slave chiplet communication interface 114b. An up vote recommendation may be transmitted when the slave chiplet power controller 112b performs an iteration of sensing (e.g., via sensors 116b) and determines that one or more portions of the slave chiplet 110b requires more power to operate efficiently and without error. The duration of one iteration of measuring and aggregating sensory information by a power controller may depend on the number of sensors and the physical length of the scan chain. For example, a full scan initiated and then aggregated by a power controller make take 30 microseconds.

The slave chiplet communication interface 114b may store a local vote table with a default value of MID. The slave chiplet communication interface 114b may update the locally stored vote table with an up vote received from the slave chiplet power controller in communication 308.

In communication 310, the slave chiplet communication interface 114b may transmit an up vote recommendation (i.e., a voltage change message) to the master chiplet communication interface 114a.

In communication 312, the master chiplet communication interface 114a may transmit a message to the master chiplet power controller 112a to stop further scan chain measurements until the end of the aggregation window. The message may include a bit, instruction, and/or command to set a certificate signing request (CSR) bit of the master chiplet power controller 112a to stop aggregating additional sensory information for the remaining duration of the present aggregation window.

In communication 314, the master chiplet communication interface 114a may generate and transmit a power rail adjustment message to the PMIC 102. The power rail adjustment message, based on the up vote recommendation, may instruct the PMIC 102 to increase voltage to an MX and/or CX power rail shared by the master chiplet 110a and the slave chiplet 110b.

In communication 316, the master chiplet communication interface 114a may transmit an acknowledgement message to the slave chiplet communication interface 114b. The acknowledgement message may include information indicating the voltage micro-adjustment performed or to be performed by the PMIC 102 in response to the communication 214. The acknowledgement message received by the slave chiplet communication interface 114b may indicate that an up vote has been immediately serviced and that the slave chiplet power controller 112b should begin a new iteration of sensory information scans in preparation of a next aggregation window.

In operation 318, the slave chiplet communication interface 114b may reset the locally stored vote table. The slave chiplet communication interface 114b, having changed the local vote table status from a mid vote ("MID") to an up vote ("UP") in communication 308, may change the stored value from UP to MID. A vote table storing a value of "MID" may represent that the presently operating voltage level of the associated chiplet is to be considered the normal operating voltage level for purposes of comparing with any up vote or down vote in a subsequent aggregation window. For example, a slave chiplet may be operating at 1 mV. An up vote indicating a need for increased voltage may change the vote table status to "UP" and the PMIC may enact the voltage change according to a power rail adjustment message (see communications 308-312). For example, the PMIC may increase the voltage across the CX power rail by 0.1 mV to supply the slave chiplet with adequate power. The slave chiplet communication interface 114b may then reset the vote table in operation 318 to store a value of "MID," such that the new operating voltage of 1.1 mV becomes the normal operating voltage and may be adjusted in a subsequent aggregation window if the recommendation is UP (i.e., need more than 1.1 mV), or DOWN (i.e., need less than 1.1 mV).

In communication 320, the slave chiplet communication interface 114b may transmit a message to the slave chiplet power controller 112b instructing the slave chiplet power controller 112b to reinitiate scanning sensory information. The communication 320 may be transmitted in response to the acknowledgment message received in communication 316. The sensory information scanned by the slave chiplet power controller 112b may be used by the slave chiplet power controller 112b to determine what, if any, voltage micro-adjustments may be performed during the following aggregation window.

In communication 322, the master chiplet communication interface 114a may transmit a message to the master chiplet power controller 112a instructing the master chiplet power controller 112a to continue further scan chain measurements. The message may include a bit, instruction, and/or command to reset the CSR bit of the master chiplet power controller 112a to reinitiate aggregating additional sensory information. The sensory information scanned by the master chiplet power controller 112a may be used by the master chiplet power controller 112a to determine what, if any, voltage micro-adjustments may be performed during the following aggregation window.

In operation 324, the master chiplet communication interface 114a may begin a new aggregation window. The time value of the aggregation window may be reset to 0 by the master chiplet communication interface 114a assuming the aggregation window did not yet expire. For example, the aggregation window time value may be 3 ms, and the up vote recommendation according to operations and communications 308-322 may have been performed within 0.5 ms after the present aggregation window began. Thus, 0.5 ms into the present aggregation window, a new aggregation window may begin and the timer of the aggregation window may be reset to 0. The master chiplet communication interface 114a may further reset the vote table to store a value of "MID" for each slave chiplet.

In operations 326 and 328, the master chiplet power controller 112a and the slave chiplet power controller 112b may perform no actions in response to a determination of a mid vote recommendation. The master chiplet power controller 112a and the slave chiplet power controller 112b may determine that no voltage micro-adjustments should be performed, such that each chiplet is being supplied with an adequate amount of power to operate normally without error. As a mid vote requires no change in voltage applied to each chiplet, mid vote recommendations by power controllers may be ignored, therefore reducing communications to the corresponding communication interfaces. A power controller may continue with a next scan chain measurement following a mid vote recommendation. For each mid vote recommendation by the slave chiplet power controller 112b, the mid vote counter (e.g., CONSECUTIVE_MID) may be incremented by the slave chiplet power controller 112b. For each mid vote recommendation by the master chiplet power controller 112a, the mid vote counter may be incremented by the master chiplet power controller 112a. When the mid vote counter reaches its preset value (e.g., 14), the power controller may enter a timeout status and may stop aggregating sensory information until a new aggregation window begins.

In operation 330, the slave chiplet power controller 112b may increment a down vote counter in response to determining, based on aggregated sensory information, that portions of the slave chiplet 110b may perform adequately at a reduced voltage level. The down vote counter (e.g., CONSEQUTIVE_DN) may be incremented by the slave chiplet power controller 112b, and the slave chiplet power controller 112b may scan a next iteration of sensory information from the scan chain.

In communication 332, the slave chiplet power controller 112b may transmit a down vote recommendation (i.e., voltage change message) to the slave chiplet communication interface 114b in response to determining that the down vote counter has been incremented to its preset value (e.g., 14). The down vote counter may be implemented by the slave chiplet power controller 112b to ensure that a recommendation to reduce voltage across an MX or CX power rail is consistent and may be performed without risk of reducing the supplied power below a sufficient operating level. In some embodiments, the down vote counter may count the total down votes despite being interrupted by one or more mid votes. For example, if the down vote counter increments 8 times, is interrupted by a mid vote, and proceeds to record 6 more downvotes to reach a down vote counter value of 14, then the slave chiplet power controller 112b may transmit the downvote recommendation to the slave chiplet communication interface 114b. In some embodiments, the down vote counter may be reset by the slave chiplet power controller 112b when interrupted by a mid vote. For example, if the slave chiplet power controller 112b increments a mid vote before reaching the down vote counter value (e.g., 14), the down vote counter may be reset to zero. Thus, a consecutive number of down votes may be required before making a down vote recommendation.

In operation 334, the slave chiplet communication interface 114b may compare the locally-stored vote table recommendation (i.e., last recommendation from previous aggregation window) with the down vote recommendation received in communication 332.

In communication 336, the slave chiplet communication interface 114b may transmit a down vote recommendation (i.e., a voltage change message) to the master chiplet communication interface 114a if the slave chiplet communication interface 114b determines that there is a change in the recommendation according to operation 334. For example, the slave chiplet communication interface 114b may transmit the down vote recommendation if its locally-stored vote table previously stored a value of "MID." After transmitting the down vote recommendation, the slave chiplet communication interface may wait to receive an acknowledgement (e.g., ack/nack) response from the master chiplet communication interface 114a before proceeding to some further operations, such as beginning a next sensory information measurement cycle.

In communication 338, the master chiplet communication interface 114a may transmit an acknowledgement (e.g., ack/nack) message to the slave chiplet communication interface 114b. The acknowledgement message may include information indicating that the master chiplet communication interface 114a received the down vote recommendation via communication 336. The acknowledgement message received by the slave chiplet communication interface 114b may include information to instruct the slave chiplet communication interface 114b to begin a new cycle of sensory information measurements in preparation of a next aggregation window.

In operation 340, the slave chiplet communication interface 114b may reset the locally stored vote table in response to receiving the communication 338. The slave chiplet communication interface 114b, having changed the local vote table status from a mid vote ("MID") to a down vote ("DOWN") in communication 308, may change the stored value from DOWN to MID in preparation of a subsequent aggregation window.

In communication 342, the slave chiplet communication interface 114b may transmit a message to the slave chiplet power controller 112b instructing the slave chiplet power controller 112b to reinitiate scanning sensory information. The communication 342 may be transmitted in response to the acknowledgment message received in communication 338. The sensory information scanned by the slave chiplet power controller 112b may be used by the slave chiplet power controller 112b to determine what, if any, voltage micro-adjustments may be performed during the following aggregation window.

Operations and communications 344-356 may be performed by the master chiplet communication interface 114a upon expiration of the aggregation window. Assuming no up vote recommendations have been made, an aggregation window may expire when its timer reaches the preset aggregation window time value (e.g., 3 ms).

In communication 344, the master chiplet communication interface 114a may transmit a message to the slave chiplet communication interface 114b to stop further scan chain measurements and vote aggregation processes until the end of the aggregation window. The master chiplet communication interface 114a may transmit the message to the slave chiplet communication interface 114b if the slave chiplet communication interface 114b did not transmit an up vote recommendation (i.e., via communication 308, 310) to the master chiplet communication interface 114a before the end of the aggregation window. The message may include a bit, instruction, and/or command to set a CSR bit of the slave chiplet communication interface 114b to stop sensory information and vote aggregation processes until further instruction (i.e., communication 356).

In operation 346, the master chiplet communication interface 114a may aggregate vote recommendations received from slave chiplet communication interfaces and the master chiplet power controller 112a. Aggregating the votes of each chiplet may determine the remaining operations and communications performed within each aggregation window. For example, if the master chiplet communication interface 114a determines that all chiplets recommend a down vote (i.e., according to operations and communications 330-342 for each chiplet), then the multiple-chiplet system may perform operations and communications 348-352. Alternatively, if the master chiplet communication interface 114a determines that at least one chiplet does not recommend a down vote (i.e., no vote or mid vote), then the multiple-chiplet system may perform communication 354.

In communication 348, the master chiplet communication interface 114a may generate and transmit a power rail adjustment message to the PMIC 102. The power rail adjustment message may instruct the PMIC 102 to decrease voltage to an MX and/or CX power rail shared by the master chiplet 110a and the slave chiplet 110b. The master chiplet communication interface 114a may transmit the power rail adjustment message in response to all chiplets recommending a down vote.

In operation 350, the master chiplet communication interface 114a may reset the vote table to store a value of "MID" for each slave chiplet that transmitted a down vote to the master chiplet communication interface 114a during a communication 336. Thus, any vote status values for any down-voting chiplet in the master chiplet vote table that were previously stored as "DOWN" may be reset by the master chiplet communication interface 114a to a "MID" status.

In communication 352, the master chiplet communication interface 114a may transmit an acknowledgement (e.g., ack) message to the slave chiplet communication interface 114b. The acknowledgement message may include information indicating the voltage micro-adjustment performed or to be performed by the PMIC 102 in response to the communication 348. The acknowledgement message received by the slave chiplet communication interface 114b may include information to instruct the slave chiplet communication interface 114b to begin a new cycle of sensory information measurements in preparation of a next aggregation window.

In communication 354, the master chiplet communication interface 114a may transmit a negative-acknowledgement (e.g., nack) message to the slave chiplet communication interface 114b. The negative-acknowledgement message may include information indicating that the master chiplet communication interface 114a did not generate a power rail adjustment message and therefore no voltage micro-adjustments were performed by the PMIC 102. The negative-acknowledgement message received by the slave chiplet communication interface 114b may include information to instruct the slave chiplet communication interface 114b to begin a new cycle of sensory information measurements in preparation of a next aggregation window.

In communication 356, the master chiplet communication interface 114a may transmit a reset message to the slave chiplet communication interface 114b. The reset message may include a bit, instruction, and/or command to reset the CSR bit of the slave chiplet power controller 112b to reinitiate aggregating additional sensory information. The sensory information scanned by the slave chiplet power controller 112b may be used by the slave chiplet power controller 112b to determine what, if any, voltage micro-adjustments may be performed during the following aggregation window. The reset message may include a bit, instructions, or command to instruct the slave chiplet communication interface 114b to reset the down vote counter and mid vote counter to 0 in preparation of the next aggregation window.

Following communication 356, a new aggregation window may be initiated by the master chiplet communication interface 114a and the operations and communications 302-356 may be repeated accordingly.

The operations and communications illustrated FIG. 3 may be performed in an order different than shown in the figure. For example, the operations 326 and 328 may be performed in any order before communication 308. As another example, the communication 316 may occur before communication 314.

For ease of illustration, operations of and communications between two chiplets (e.g., chiplets 110a, 110b) is shown. However, the same steps performed by or in conjunction with 110b may be simultaneously performed by additional chiplets that are in electrical communication (e.g., 110c, 110d) to the master chiplet 110a. For example, communication 316 may be transmitted to chiplets 110b, 110c, and 110d in response to an up vote recommendation made by the slave chiplet communication interface 114c. As another example, the master chiplet communication interface 114a may transmit a power rail adjustment message according to communication 348 when the master chiplet power controller 112a recommends a down vote and the slave chiplet communication interfaces 114b, 114c, and 114d all recommend a down vote according to communication 336.

FIG. 4 is message flow diagram 400 illustrating operations and device-to-device communications for managing power within a multiple-chiplet system utilizing a vote table according to some embodiments. The processes described with reference to FIG. 4 may reduce the load on the master chiplet communication interface 114a.

In overview of the embodiment illustrated in FIG. 4, a vote table may be utilized by each chiplet and for each power rail, the results of which may be used by the master chiplet communication interface 114a to generate a power rail adjustment message. The master chiplet communication interface 114a may maintain a vote table and aggregate the vote table results when there is a change in a vote (e.g., UP/DOWN/MID) for any chiplet. By aggregating only if there is a change in the vote table, aggregation speed is increased and computational resource usage may be minimized (i.e., reduced number of processor cycles used to aggregate vote table results and generate a power rail adjustment message). After the PMIC 102 effectuates voltage micro-adjustments according to a power rail adjustment message and the power rail(s) voltage is stabilized, the vote table may be reset and no more aggregation may be required until a next change in a chiplet voting is observed. By utilizing a master chiplet communication interface 114a vote table and slave chiplet communication interface 114b vote table without an aggregation window, vote aggregation may occur only when there is a change in the master chiplet vote table, instead of at the end of every aggregation window. Thus, by avoiding a default aggregation cycle (e.g., every 3 ms) in which no voltage micro-adjustments need to be enacted, processor cycles may be conserved. For example, assuming voltage requirements throughout all chiplets remain consistent and do not need to be increased or decreased, the master chiplet 110a may avoid using processor cycles on aggregation processes indefinitely.

Generally, the operations and communications in the embodiment illustrated in FIG. 4 may implement the following rules: up votes are immediately serviced to avoid functional failures; slave chiplet communication interfaces 114b, 114c, 114d store latest up-vote MID/DOWN vote recommendation in vote tables, compare with previous vote recommendation, and transmit interrupt to the master chiplet communication interface 114a only when there is change; and the master chiplet communication interface 114a aggregates only when there is a change in the vote table stored by the master chiplet communication interface 114a. The overarching methodologies of FIG. 3 may be represented by the following high-level algorithm:

For each (aggregation window)
If (power controller recommends UP vote)
increase the voltage to UP and start new aggregation window
else (power controller recommends DOWN/MID vote)
check against previous vote and send interrupt only if there is a change
aggregate votes from all chiplets if there is change in Master vote table and take necessary action.

Referring to FIG. 4, in operations 402 and 404, counters within the master chiplet power controller 112a and slave chiplet power controller 112b may be set to predetermined counter values in preparation of a newly initiated aggregation window. Counters may be preset and/or may be configurable by the master chiplet power controller 112a and the slave chiplet power controller 112b at system initialization. Counters may be set or preset for each voting type. For example, an up vote counter such as CONSEQUTIVE_UP may be set to a value of 0 (i.e., no wait time once the power controller recommends a voltage increase so that power demands are met as soon as possible), a mid vote counter such as CONSEQUTIVE_MID may be set to 10, and a down vote counter such as CONSEQUTIVE_DN may be set to 10. The counter values may determine how long a power controller may wait before sending a voltage change message, if any, to the corresponding communication interface within a chiplet. During the counter wait times, the power controllers may continue to receive and aggregate sensory information from the corresponding scan chain sensors. In some embodiments, an up vote counter may be set to a value other than 0, such that up votes are not immediately serviced, and may instead allow a power controller to wait a small period (e.g., counter value 3) to aggregate additional sensory information related to an up vote (i.e., recommend to perform a larger voltage micro-adjustment).

The various counters may be used to minimize total transmissions from power controllers (e.g., 112a, 112b, 112c, 112d) to their respective communication interfaces (e.g., 114a, 114b, 114c, 114d), as opposed to transmitting a mid vote or down vote upon completion of every power controller sensory information scan (e.g., every 30 microseconds). By waiting for and aggregating down votes and mid votes, which are not high priority as are up votes, the number of communications and operations performed by and the number of interrupts experienced by the communication interfaces (e.g., 114a, 114b, 114c, 114d) may be reduced (i.e., voltage change messages are held in a waiting period instead of being automatically transmitted to the communication interfaces after every sensory information scan). Thus, implementing wait time counters and an aggregation window may allow the voltage change messages to be transmitted in intervals to the slave chiplet communication interfaces and ultimately to the master chiplet communication interface, therefore reducing the overhead and computational resources used.

In operation 406 and 408, the slave chiplet communication interface 114b and the master chiplet communication interface 114a may each initialize a locally-stored vote table upon system boot. Each vote table stored by each chiplet communication interface may be initialized with a vote recommendation of MID. Each locally-stored vote table may store information related to the latest voting recommendation of the corresponding chiplet. For example, the slave chiplet communication interface 114b may store a vote table storing a value of MID, and the master chiplet communication interface 114a may store a vote table storing a value of MID.

In operation 410, the master chiplet communication interface 114a may initialize a global, locally-stored vote table upon system boot. This global vote table, separate from the vote table initialized in operation 408, may store the latest voting recommendation of each chiplet (e.g., 110b, 110c, 110d) in communication with the master chiplet 110a. Each vote table status corresponding to each chiplet may be initialized with a vote recommendation of MID. For example, the global vote table may be initialized by the master chiplet communication interface 114a to store a value of MID corresponding to the latest vote recommendation of the slave chiplet power controller 112b, and may also be initialized to store a value of MID corresponding to the latest vote recommendation of the master chiplet power controller 112a.

In operation 412, the slave chiplet power controller 112b may aggregate sensory information to determine that an up vote recommendation should be transmitted to the master chiplet communication interface 114a for purposes of generating a power rail adjustment message. The slave chiplet power controller 112b may perform an iteration of sensing (e.g., via sensors 116b) and may determine that one or more portions of the slave chiplet 110b requires more power to operate efficiently and without error. The duration of one iteration of measuring and aggregating sensory information by a power controller may depend on the number of sensors and the physical length of the scan chain. For example, a full scan initiated and then aggregated by a power controller make take 30 microseconds.

In communication 414, the slave chiplet power controller 112b may transmit an up vote recommendation (i.e., a voltage change message) to the slave chiplet communication interface 114b. An up vote recommendation may be transmitted when the slave chiplet power controller 112b performs an iteration of sensing (e.g., via sensors 116b) and determines that one or more portions of the slave chiplet 110b requires more power to operate efficiently and without error. The slave chiplet communication interface 114b may store a local vote table with a default value of MID as initialized in operation 406. The slave chiplet communication interface 114b may update the locally stored vote table with an up vote (i.e., "UP") received from the slave chiplet power controller 112b.

In communication 416, the slave chiplet communication interface 114b may transmit an up vote recommendation (i.e., a voltage change message) to the master chiplet communication interface 114a. The master chiplet communication interface 114a may alter the global vote table value associated with the slave chiplet 110b from a MID value to an UP value corresponding to the latest vote recommendation change. Following communication 414, the multiple-chiplet system may continue to perform the operations and communications 428-438.

In operation 418, the slave chiplet power controller 112b may increment a down vote counter and/or a mid vote counter in response to determining, based on aggregated sensory information, that portions of the slave chiplet 110b may perform adequately at a reduced voltage level (i.e., down vote), or with no voltage change (i.e., mid vote). The down vote counter (e.g., CONSEQUTIVE_DN) or the mid vote counter (e.g., CONSEQUTIVE_MID) may be incremented by the slave chiplet power controller 112b, and the slave chiplet power controller 112b may scan a next iteration of sensory information from the scan chain.

In communication 420, the slave chiplet power controller 112b may transmit a down vote recommendation (i.e., voltage change message) to the slave chiplet communication interface 114b in response to determining that the down vote counter has been incremented to its preset value (e.g., 10) of that the mid vote counter has been incremented to its preset value (e.g., 10). The down vote counter may be implemented by the slave chiplet power controller 112b to ensure that a recommendation to reduce voltage across an MX or CX power rail is consistent and may be performed without risk of reducing the supplied power below a sufficient operating level. The mid vote counter may be implemented by the slave chiplet power controller 112b to ensure that a voltage across an MX or CX power rail remains unadjusted. In some embodiments, the down vote counter may increment total down votes despite being interrupted by one or more mid votes. For example, if the down vote counter increments 8 times, is interrupted by a mid vote, and proceeds to record 6 more downvotes to reach a down vote counter value of 14, then the slave chiplet power controller 112b may transmit the downvote recommendation to the slave chiplet communication interface 114b. Similarly, in some embodiments, the mid vote counter may increment total mid votes despite being interrupted by one or more down votes. In some embodiments, the down vote counter may reset when interrupted by a mid vote, and the mid vote counter may reset when interrupted by a down vote. For example, if the slave chiplet power controller 112b increments a mid vote before reaching the down vote counter value (e.g., 14), the down vote counter may be reset to zero. Thus, a consecutive number of down votes may be required before making a down vote recommendation, and a consecutive number of mid votes may be required before making a mid vote recommendation.

In operation 422, the slave chiplet communication interface 114b may compare the locally-stored vote table recommendation (i.e., last recommendation from previous aggregation window) with the down vote recommendation received in communication 420. Based on the comparison, the system will continue to execute either communication 424 or communication 426. If the slave chiplet communication interface 114b determines that the stored vote table value (e.g., MID) is different from the latest vote recommendation (e.g., DOWN), then the system may execute communication 424. If the slave chiplet communication interface 114b determines that the stored vote table value (e.g., MID) is the same as the latest vote recommendation (e.g., MID), then the system may execute communication 426.

In communication 424, the slave chiplet communication interface 114b may transmit a down vote recommendation (i.e., a voltage change message) to the master chiplet communication interface 114a if the slave chiplet communication interface 114b determines that there is a change in the vote table recommendation according to operation 422. For example, the slave chiplet communication interface 114b may transmit the down vote recommendation if its locally-stored vote table previously stored a value of "MID." After transmitting the down vote recommendation, the slave chiplet communication interface 114b may wait to receive an acknowledgement (e.g., ack/nack) response from the master chiplet communication interface 114a before proceeding to some further operations, such as beginning a next sensory information measurement cycle via the slave chiplet power controller 112b.

In communication 426, the slave chiplet communication interface 114b may transmit a negative-acknowledgement message to the slave chiplet power controller 112b if the slave chiplet communication interface 114b determines that there is no change in the vote table recommendation according to operation 422. The nack message may instruct the slave chiplet power controller 112b to reinitiate scanning sensory information. The sensory information scanned by the slave chiplet power controller 112b may be used by the slave chiplet power controller 112b to determine what, if any, voltage micro-adjustments may be performed during the subsequent vote table value comparisons according to operation 422.

In operation 428, the master chiplet communication interface 114a may aggregate vote recommendations received from slave chiplet communication interfaces and the master chiplet power controller 112a. The master chiplet communication interface 114a may aggregate the vote recommendation received from each chiplet in communications 416 and/or 424, and compare the received vote recommendations against the corresponding values stored within the global vote table. Based on the comparison between global vote table values and latest vote recommendations, the master chiplet communication interface 114a may execute various operations and communications. For example, if the master chiplet communication interface 114a determines that any chiplet recommends a down vote or up vote, then the multiple-chiplet system may perform operations and communications 430-436. Alternatively, if the master chiplet communication interface 114a determines that there is no difference between global vote table values and the latest vote recommendations for each chiplet, then the multiple-chiplet system may perform communication 438.

In communication 430, the master chiplet communication interface 114a may transmit a message to the slave chiplet power controller 112b to stop further scan chain measurements and vote aggregation processes until the end of the aggregation window. The message may include a bit, instruction, and/or command to set a CSR bit of the slave chiplet communication interface 114b to stop sensory information and vote aggregation processes until further instruction.

In communication 432, the master chiplet communication interface 114a may generate and transmit a power rail adjustment message to the PMIC 102. Based on the comparison performed in operation 428, the power rail adjustment message may instruct the PMIC 102 to decrease and/or increase voltage to an MX and/or CX power rail shared by the master chiplet 110a and the slave chiplet 110b.

In communication 434, the master chiplet communication interface 114a may transmit an acknowledgement (e.g., ack) message to the slave chiplet communication interface 114b. The acknowledgement message may include information indicating the voltage micro-adjustment performed or to be performed by the PMIC 102 in response to the communication 432. The acknowledgement message received by the slave chiplet communication interface 114b may include information to instruct the slave chiplet communication interface 114b to begin a new cycle of sensory information measurements in preparation of further vote recommendation changes (i.e., voltage changes messages).

In operation 436, the master chiplet communication interface 114a may reset the global vote table to store a value of "MID" for each slave chiplet that transmitted a down vote or up vote to the master chiplet communication interface 114a during a communication 416 and/or 424. Thus, any vote status values for any down-voting or up-voting chiplet in the master chiplet global vote table that were previously stored as "DOWN" or "UP" may be reset to a "MID" status. In some embodiments, the entire global vote table stored by the master chiplet communication interface 114a may be reset to store values of "MID" for every chiplet, regardless of whether the chiplet voted in the latest vote table comparison as described in operation 428.

In communication 438, the master chiplet communication interface 114a may transmit a negative-acknowledgement (e.g., nack) message to the slave chiplet communication interface 114b. The negative-acknowledgement message may include information indicating that the master chiplet communication interface 114a did not generate a power rail adjustment message and therefore no voltage micro-adjustments were performed by the PMIC 102. The negative-acknowledgement message received by the slave chiplet communication interface 114b may include information to instruct the slave chiplet communication interface 114b to begin a new cycle of sensory information measurements in preparation of further vote table comparisons.

Following the operation 436 or the communication 438, a new vote table comparison cycle may be initiated by the master chiplet communication interface 114a and the operations and communications 402-438 may be repeated accordingly.

The operations and communications illustrated FIG. 4 may be performed in an order different than shown in the figure. For example, the operations 418-426 may be performed in any order before operation 412. As another example, the communication 434 may occur after operation 436.

For ease of illustration, operations of and communications between two chiplets (e.g., chiplets 110a, 110b) is shown. However, the same steps performed by or in conjunction with 110b may be simultaneously performed by additional chiplets that are in electrical communication (e.g., 110c, 110d) to the master chiplet 110a. For example, communication 434 may be transmitted to chiplets 110b, 110c, and 110d in response to an up vote or down vote recommendation made by the slave chiplet communication interface 114c. As another example, the master chiplet communication interface 114a may transmit a power rail adjustment message according to communication 432 when the master chiplet power controller 112a recommends a down vote or up vote and/or at least one of the slave chiplet communication interfaces 114b, 114c, and 114d recommends a down vote or up vote according to communication 416 and/or 424.

Note that reference to chiplet 110a being the master chiplet in the forgoing descriptions is merely for example purposes, and that any one of the chiplets 110a-110d may function as the master chiplet while the other chiplets function as the slave chiplets. Thus, the foregoing descriptions are not intended to imply any limitations on which chiplets function as master or slave in various embodiments.

Figure 5:
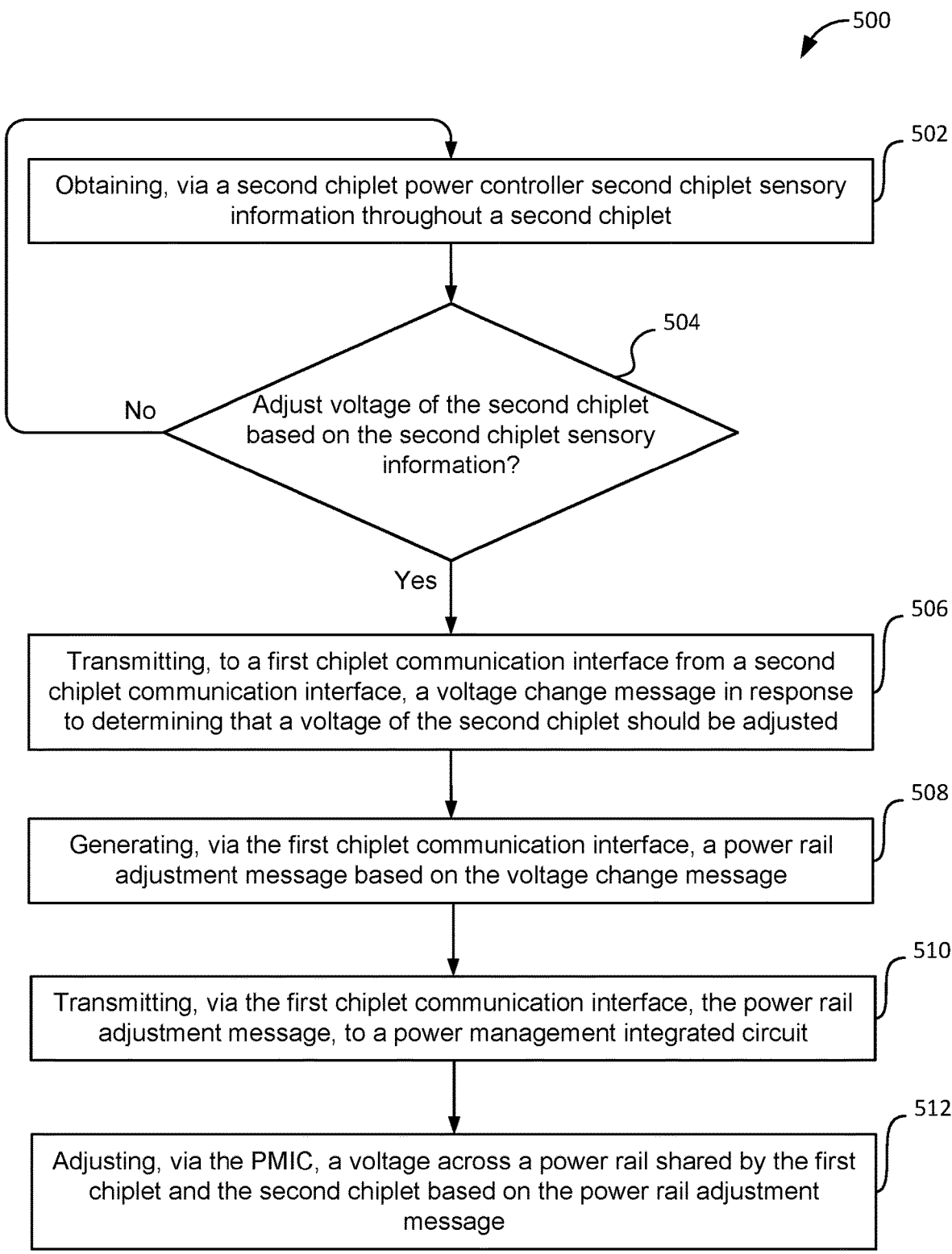
FIG. 5 is a process flow diagram illustrating an embodiment method for managing power within a multiple-chiplet system according to various embodiments.

FIG. 5 is a process flow diagram illustrating an embodiment method 500 for managing power in a multiple-chiplet system according to various embodiments. With reference to FIGS. 1-5, the method 500 may be implemented in a processor (e.g., processing cores 124a, 124b, 124c, 124d controlling power controllers 112a, 112b, 112c, 112d and communication interfaces 114a, 114b, 114c, 114d respectively) configured to perform operations of the method. In some embodiments, the processor (e.g., processing cores 124a, 124b, 124c, 124d) may be configured to perform the operations by processor-executable instruction stored in a non-transitory processor-readable medium (e.g., memory devices 122a, 122b, 122c, and 122d). Means for performing each of the operations of the method 500 may be a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 502, a second chiplet power controller may obtain second chiplet sensory information throughout a second chiplet. A second chiplet power controller (e.g., slave chiplet power controller 112b) may obtain and aggregate sensory information corresponding to sensory parameters (e.g., temperature, power, voltage, current values) measured by sensors (e.g., sensors 116b) throughout the second chiplet (e.g., slave chiplet 110b). The processes in block 502 may be performed as described with reference to operations 224, 226, 228, 326, 330, 412, and 418 of FIGS. 2, 3, and 4 respectively. Means for performing the operations in block 502 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In determination block 504, the second chiplet power controller may determine whether a voltage of the second chiplet should be adjusted based on the second chiplet sensory information. The second chiplet power controller (e.g., slave chiplet power controller 112b) may determine whether a voltage of the second chiplet (e.g., slave chiplet 110b) should be adjusted based on sensory information obtained in block 502 as described. In some embodiments, determining whether a voltage of the second chiplet should be adjusted in determination block 504 may be based on the second chiplet sensory information may include determining whether the second sensory information indicates that a sensory parameter is outside of a threshold range. The processes in determination block 504 may be performed as described with reference to operations 224, 226, 228, 326, 330, 412, and 418 of FIGS. 2, 3, and 4 respectively. For example, a sensor (e.g., 116b) may measure a voltage parameter of a processor core operating below a threshold level. The sensor may relay this measurement to the second chiplet power controller to allow the second chiplet power controller to determinate that a voltage of the processor core may be increased based on the sensory information. Means for performing the operations in determination block 504 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In response to determining that a voltage of the second chiplet should not be adjusted based on the second chiplet sensory information (i.e., determination block 504="No"), the second chiplet power controller may continue to obtain second chiplet sensory information throughout the second chiplet as described in block 502 until the second chiplet power controller determines that a voltage of the second chiplet should be adjusted (i.e., an operating parameter measured by sensors falls outside of a threshold range).

In response to determining that a voltage of the second chiplet should be adjusted based on the second chiplet sensory information (i.e., determination block 504="Yes"), a second chiplet communication interface may transmit a voltage change message to a first chiplet communication interface in block 506. A second chiplet communication interface (e.g., slave chiplet communication interface 114b) may transmit a voltage change message to a first chiplet communication interface (e.g., master chiplet communication interface 114a) in response to determining that a voltage of the second chiplet (e.g., slave chiplet 110b) should be adjusted based on the second chiplet sensory information. The processes in block 506 may be performed as described with reference to communications 210, 232, 310, 336, 416, and 424 of FIGS. 2, 3, and 4 respectively. Means for performing the operations in block 506 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 508, the first chiplet communication interface may generate a power rail adjustment message based on the voltage change message. The first chiplet communication interface (e.g., master chiplet communication interface 114a) may generate a power rail adjustment message based on the voltage change message received from the second chiplet communication interface (e.g., slave chiplet communication interface 114b). The power rail adjustment message may indicate or otherwise include information regarding the voltage adjustments that should be made to the power rail(s) of the second chiplet. The power rail adjustment message may be generated based on voltage change messages received by the first chiplet communication interface from the second chiplet communication interface, other chiplet communication interfaces, and/or a first chiplet power controller. Means for performing the operations in block 508 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 510, the first chiplet communication interface may transmit the power rail adjustment message to a PMIC.

The first chiplet communication interface (e.g., master chiplet communication interface 114a) may transmit the power rail adjustment message to the PMIC (e.g., PMIC 102). The processes in blocks 508 and 510 may be performed as described with reference to communications 214, 234, 244, 314, 348, and 432 of FIGS. 2, 3, and 4 respectively. Means for performing the operations in block 510 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 512, the PMIC may adjust a voltage across a power rail shared by the first chiplet and the second chiplet based on the power rail adjustment message. The PMIC (e.g., PMIC 102) may adjust one or more voltages across one or more power rails (e.g., MX power rail, CX power rail) shared by the first chiplet (e.g., master chiplet 110a) and the second chiplet (e.g., slave chiplet 110b). Means for performing the operations in block 512 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

The order of operations performed in blocks 502-512 is merely illustrative, and the operations of blocks 502-512 may be performed in any order and partially simultaneously in some embodiments. In some embodiments, the method 500 may be performed by a processor of a device independently from, but in conjunction with, an external memory device. For example, the method 500 may be implemented as a software module executing within a processor of an SOC or in dedicated hardware within an SOC that issues commands to establish secure memory channels and access memory of an external memory device and is otherwise configured to take actions and store data as described.

Figure 6A:
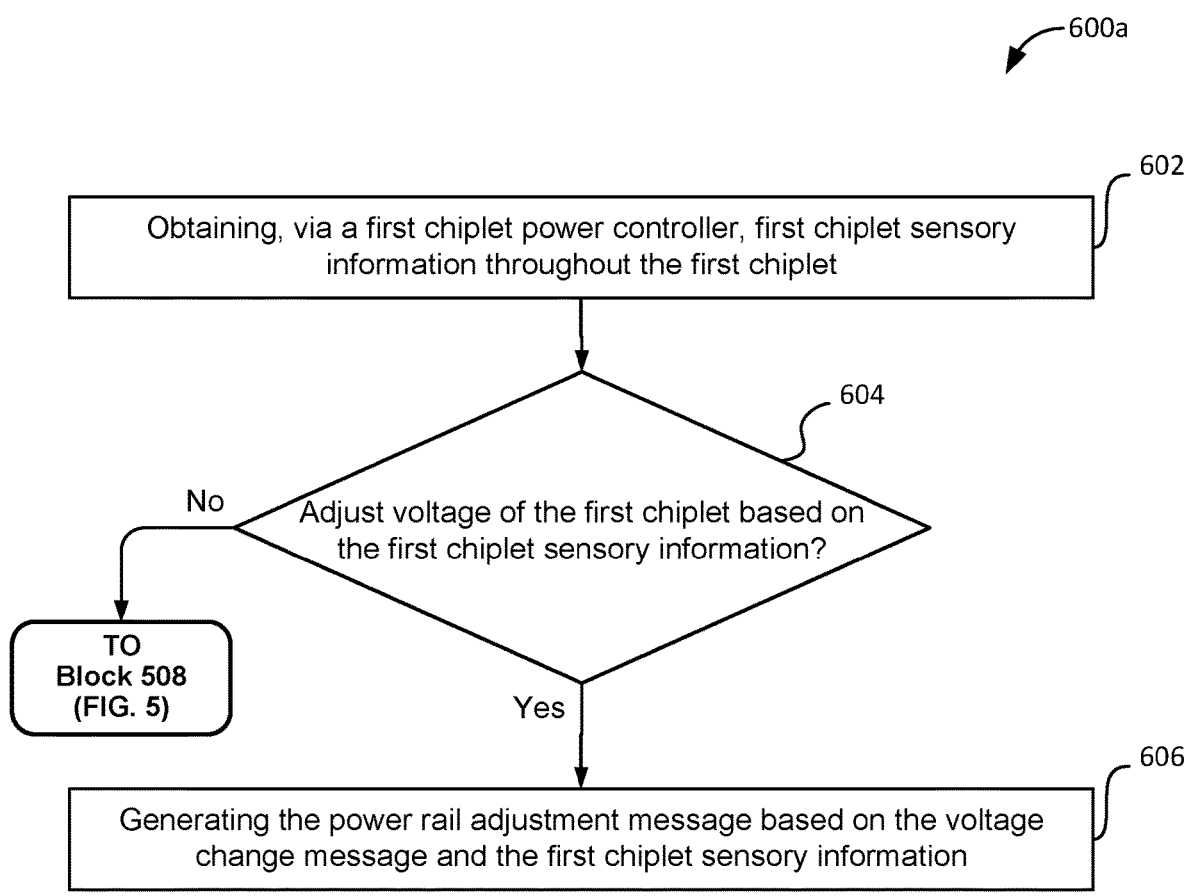
FIGS. 6A-6G are process flow diagrams illustrating embodiment methods that may be performed as part of managing power within a multiple-chiplet system according to some embodiments.

FIG. 6A is a process flow diagram illustrating an embodiment method 600a for managing power in a multiple-chiplet system that may be implemented as part of the method 500 in some embodiments. With reference to FIGS. 1-6A, the method 600a may be implemented in a processor (e.g., processing cores 124a, 124b, 124c, 124d controlling power controllers 112a, 112b, 112c, 112d and communication interfaces 114a, 114b, 114c, 114d respectively) configured to perform operations of the method. In some embodiments, the processor (e.g., processing cores 124a, 124b, 124c, 124d) may be configured to perform the operations by processor-executable instruction stored in a non-transitory processor-readable medium (e.g., memory devices 122a, 122b, 122c, and 122d). Means for performing each of the operations of the method 600a may be a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

The order of operations performed in blocks 602-606 is merely illustrative, and the operations of blocks 602-606 may be performed in any order and partially simultaneously in some embodiments. In some embodiments, the method 600a may be performed by a processor of a device independently from, but in conjunction with, an external memory device. For example, the method 600a may be implemented as a software module executing within a processor of an SOC or in dedicated hardware within an SOC that issues commands to establish secure memory channels and access memory of an external memory device and is otherwise configured to take actions and store data as described.

In block 602, a first chiplet power controller may obtain first chiplet sensory information throughout the first chiplet. A first chiplet power controller (e.g., master chiplet power controller 112*a*) may obtain and aggregate sensory information corresponding to sensory parameters (e.g., temperature, power, voltage, current values) measured by sensors (e.g., sensors 116*a*) throughout the first chiplet (e.g., master chiplet 110*a*). This process may be performed in parallel with the processes in block 502 as described with reference to FIG. 5. Means for performing the operations in block 602 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In determination block 604, the first chiplet power controller may determine whether a voltage of the first chiplet should be adjusted based on the first chiplet sensory information. The first chiplet power controller (e.g., master chiplet power controller 112*a*) may determine whether a voltage of the first chiplet (e.g., master chiplet 110*a*) should be adjusted based on sensory information obtained in block 602. In some embodiments, determining whether a voltage of the first chiplet should be adjusted based on the first chiplet sensory information may include determining whether the first sensory information indicates that a sensory parameter is outside of a threshold range. For example, a sensor (e.g., 116*a*) may measure a voltage parameter of a processor core operating below a threshold level. The sensor may relay this measurement to the first chiplet power controller to allow the first chiplet power controller to determinate that a voltage of the processor core may be increased based on the sensory information. Means for performing the operations in determination block 604 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In response to determining that a voltage of the first chiplet should not be adjusted based on the first chiplet sensory information (i.e., determination block 604="No"), the first chiplet communication interface may continue to generate a power rail adjustment message based on the voltage change message in block 508 of the method 500 (FIG. 5) as described. In other words, a power rail adjustment message may be generated based on the voltage change message received by the first chiplet communication interface from the second chiplet communication interface, and not based on first chiplet sensory information.

In response to determining that a voltage of the first chiplet should be adjusted based on the first chiplet sensory information (i.e., determination block 604="Yes"), the first chiplet communication interface may generate a power rail adjustment message based on the voltage change message from the second chiplet and the first chiplet sensory information in block 606. The first chiplet power controller (e.g., master chiplet power controller 112*a*) may relay the first chiplet sensory information to the first chiplet communication interface (e.g., master chiplet communication interface 114*a*) in the form of a voltage change message. The first chiplet communication interface may generate a power rail adjustment message based on the voltage change message received from the second chiplet communication interface (e.g., slave chiplet communication interface 114*b*) and on the first sensory information. The power rail adjustment message may indicate or otherwise include information regarding the voltage adjustments that should be made to the power rail(s) of the first chiplet (e.g., master chiplet 110*a*) and the second chiplet (e.g., 110*b*). The power rail adjustment message may be generated based on voltage change messages received by the first chiplet communication interface from the second chiplet communication interface, other chiplet communication interfaces, and/or a first chiplet power controller. Means for performing the operations in block 606 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

Figure 6B:
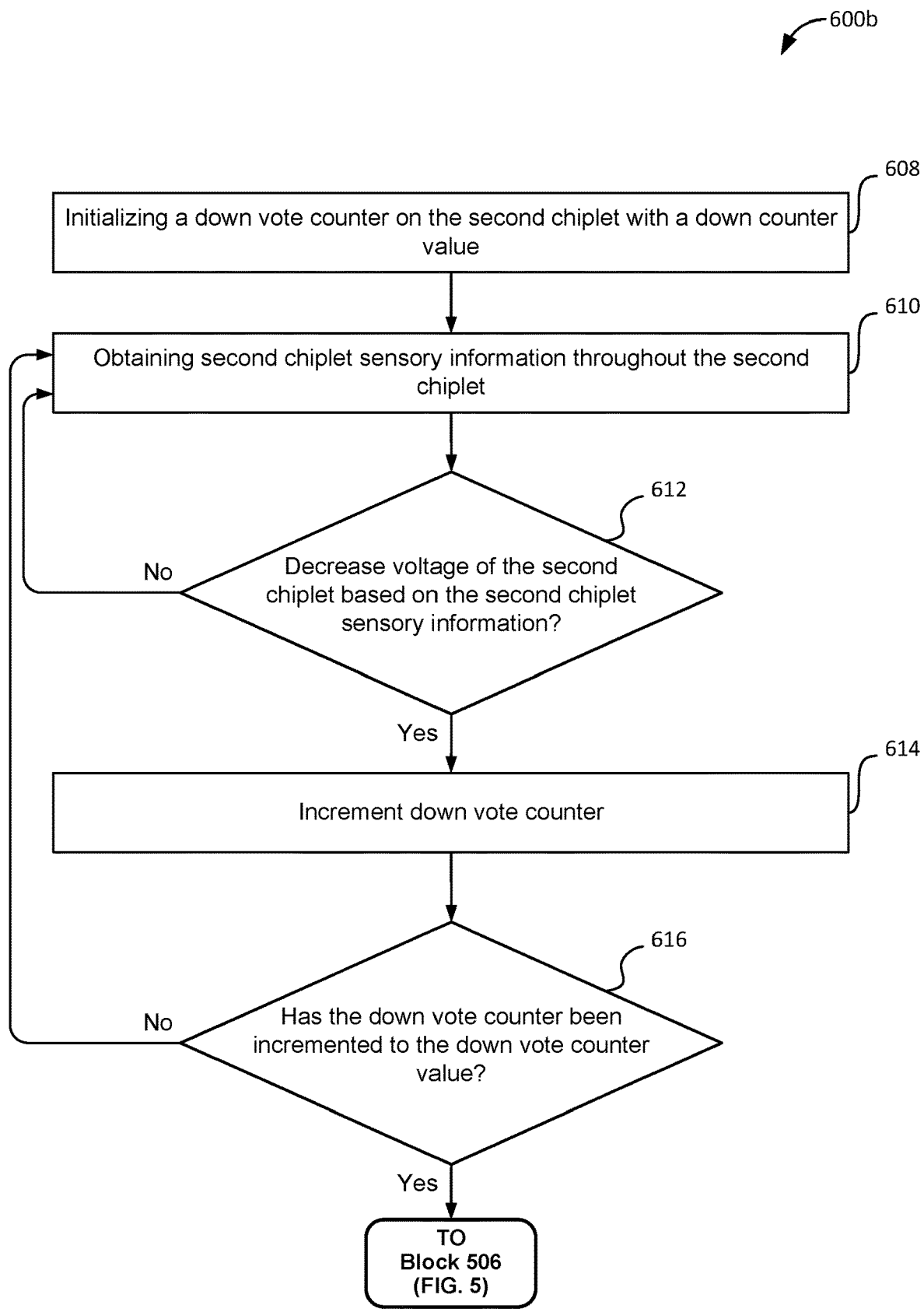

FIG. 6B is a process flow diagram illustrating an embodiment method 600*b* for managing power in a multiple-chiplet system that may be implemented as part of the method 500 in some embodiments. With reference to FIGS. 1-6B, the method 600*b* may be implemented in a processor (e.g., processing cores 124*a*, 124*b*, 124*c*, 124*d* controlling power controllers 112*a*, 112*b*, 112*c*, 112*d* and communication interfaces 114*a*, 114*b*, 114*c*, 114*d* respectively) configured to perform operations of the method. In some embodiments, the processor (e.g., processing cores 124*a*, 124*b*, 124*c*, 124*d*) may be configured to perform the operations by processor-executable instruction stored in a non-transitory processor-readable medium (e.g., memory devices 122*a*, 122*b*, 122*c*, and 122*d*). Means for performing each of the operations of the method 600*b* may be a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

The order of operations performed in blocks 608-616 is merely illustrative, and the operations of blocks 608-616 may be performed in any order and partially simultaneously in some embodiments. In some embodiments, the method 600*b* may be performed by a processor of a device independently from, but in conjunction with, an external memory device. For example, the method 600*b* may be implemented as a software module executing within a processor of an SOC or in dedicated hardware within an SOC that issues commands to establish secure memory channels and access memory of an external memory device and is otherwise configured to take actions and store data as described.

In block 608, a down vote counter value may be initialized by a second chiplet power controller on the second chiplet. The down vote counter value may be initialized by a second chiplet power controller (e.g., slave chiplet power controller 112*b*) on the second chiplet (e.g., slave chiplet 110*b*) in preparation for iteratively determining a consecutive number of obtained second sensory information indicating that voltage to a component of the second chiplet may be reduced. The down vote counter value may be initialized by a second chiplet power controller on the second chiplet in block 608 as described with reference to operations 202, 302, and 402 of FIGS. 2, 3, and 4 respectively. Means for performing the operations in block 608 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In block 610, a second chiplet power controller may obtain second chiplet sensory information throughout a second chiplet. A second chiplet power controller (e.g., slave chiplet power controller 112*b*) may obtain and aggregate sensory information corresponding to sensory parameters (e.g., temperature, power, voltage, current values) measured by sensors (e.g., sensors 116*b*) throughout the second chiplet (e.g., slave chiplet 110b). As described with reference to block 502 of the method 500 (FIG. 5), obtaining second chiplet sensory information throughout the second chiplet may include iteratively obtaining second chiplet sensory information throughout the second chiplet for purposes of incrementing a down vote counter. The second chiplet power controller may obtain second chiplet sensory information throughout the second chiplet in block 610 as described with reference to operations 224, 226, 228, 326, 330, 412, and 418 of FIGS. 2, 3, and 4 respectively. Means for performing the operations in block 610 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In determination block 612, the second chiplet power controller may determine whether a voltage of the second chiplet should be adjusted based on the second chiplet sensory information. The second chiplet power controller (e.g., slave chiplet power controller 112b) may determine whether a voltage of the second chiplet (e.g., slave chiplet 110b) should be adjusted based on sensory information obtained as described with reference to block 610. In some embodiments, determining whether a voltage of the second chiplet should be adjusted based on the second chiplet sensory information may include determining whether the second sensory information indicates that a sensory parameter is outside of a threshold range. The processes in determination block 612 may be performed as described with reference to operations 224, 226, 228, 326, 330, 412, and 418 of FIGS. 2, 3, and 4 respectively. For example, a sensor (e.g., 116b) may measure a voltage parameter of a processor core operating below a threshold level. The sensor may relay this measurement to the second chiplet power controller to allow the second chiplet power controller to determinate that a voltage of the processor core may be increased based on the sensory information. Means for performing the operations in determination block 612 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In response to determining that a voltage of the second chiplet should not be decreased based on the second chiplet sensory information (i.e., determination block 612="No"), the second chiplet power controller may continue to iteratively obtain second chiplet sensory information throughout the second chiplet in block 610 as described until the second chiplet power controller determines that a voltage of the second chiplet should be decreased (i.e., an operating parameter measured by sensors falls outside of a threshold range).

In response to determining that a voltage of the second chiplet should be decreased based on the second chiplet sensory information (i.e., determination block 612="Yes"), the second chiplet communication interface may increment the down vote counter in block 614. The down vote counter may be incremented for each iteration of obtaining second chiplet sensory information indicating that the voltage of the second chiplet should be decreased as described in blocks 610 and 612. The processes in block 614 may be performed as described with reference to operations 228, 330, and 418 of FIGS. 2, 3, and 4 respectively. Means for performing the operations in block 614 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In determination block 616, the second chiplet power controller may determine whether the down vote counter has been incremented to the down vote counter value. The second chiplet power controller (e.g., slave chiplet power controller 112b) may determine whether sufficient iterations of the processes in blocks 610-614 have repeatedly indicated that a portion of the second chiplet may operate at reduced voltage. The processes in block 614 may be performed as described with reference to operations 228, 330, and 418 of FIGS. 2, 3, and 4 respectively. Means for performing the operations in determination block 616 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In response to determining that the down vote counter has not been incremented to the down vote counter value (i.e., determination block 616="No"), the second chiplet power controller may continue to iteratively obtain second chiplet sensory information throughout the second chiplet as described in blocks 610-614 until the down vote counter has been incremented to the down vote counter value (i.e., the second chiplet has consecutively recorded sensory information indicating that a voltage of the second chiplet may be decreased).

In response to determining that the down vote counter has been incremented to the down vote counter value (i.e., determination block 616="Yes"), the second chiplet communication interface may continue to transmit a voltage change message to a first chiplet communication interface in block 506 of the method 500 (FIG. 5) as described. In other words, transmitting the voltage change message to the first chiplet may include transmitting the voltage change message in response to the down vote counter reaching the down vote counter value.

Figure 6C:
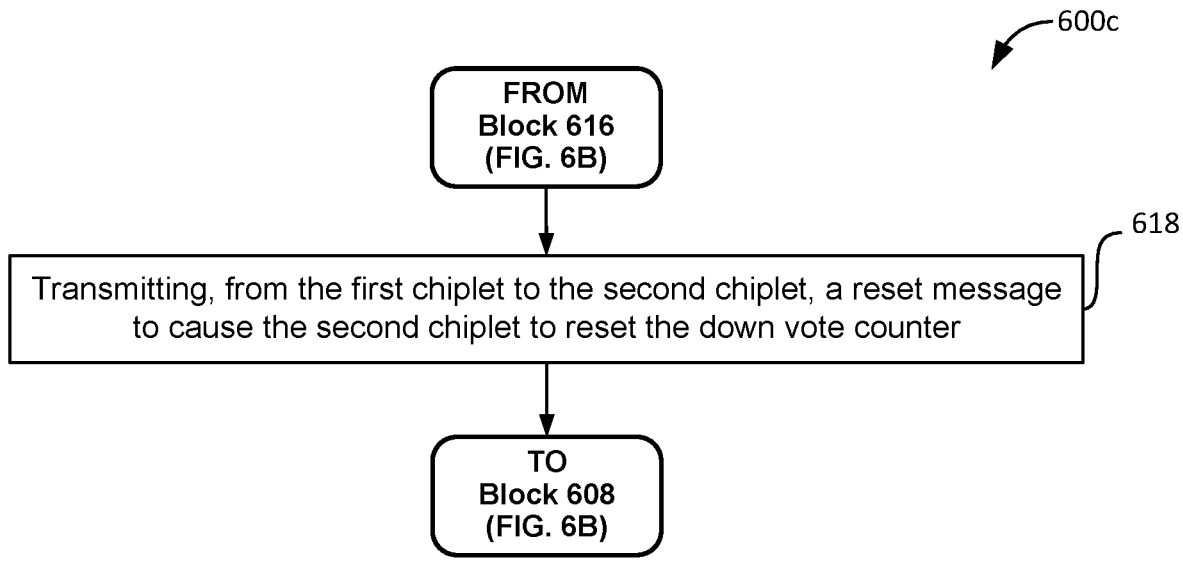

FIG. 6C is a process flow diagram illustrating an embodiment method 600c for managing power in a multiple-chiplet system that may be implemented as part of the method 500 in some embodiments. With reference to FIGS. 1-6C, the method 600c may be implemented in a processor (e.g., processing cores 124a, 124b, 124c, 124d controlling power controllers 112a, 112b, 112c, 112d and communication interfaces 114a, 114b, 114c, 114d respectively) configured to perform operations of the method. In some embodiments, the processor (e.g., processing cores 124a, 124b, 124c, 124d) may be configured to perform the operations by processor-executable instruction stored in a non-transitory processor-readable medium (e.g., memory devices 122a, 122b, 122c, and 122d). Means for performing each of the operations of the method 600c may be a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

Following the operations of block 616 of the method 600b (FIG. 6B), the first chiplet communication interface may transmit a reset message to the second chiplet communication interface to cause the second chiplet communication interface to reset the down vote counter in block 618. The first chiplet communication interface (e.g., master chiplet communication interface 114a) may transmit the reset message to the second chiplet communication interface (e.g., slave chiplet communication interface 114b) to cause the second chiplet communication interface to instruct the second chiplet power controller (e.g., slave chiplet power controller 112b) to reset the down vote counter. The system may then proceed to perform operations of block 608 of the method 600*b* (FIG. 6B). The processes in block 618 may be performed as described with reference to communications 246 and 356 of FIGS. 2 and 3 respectively. Means for performing the operations in block 618 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

Figure 6D:
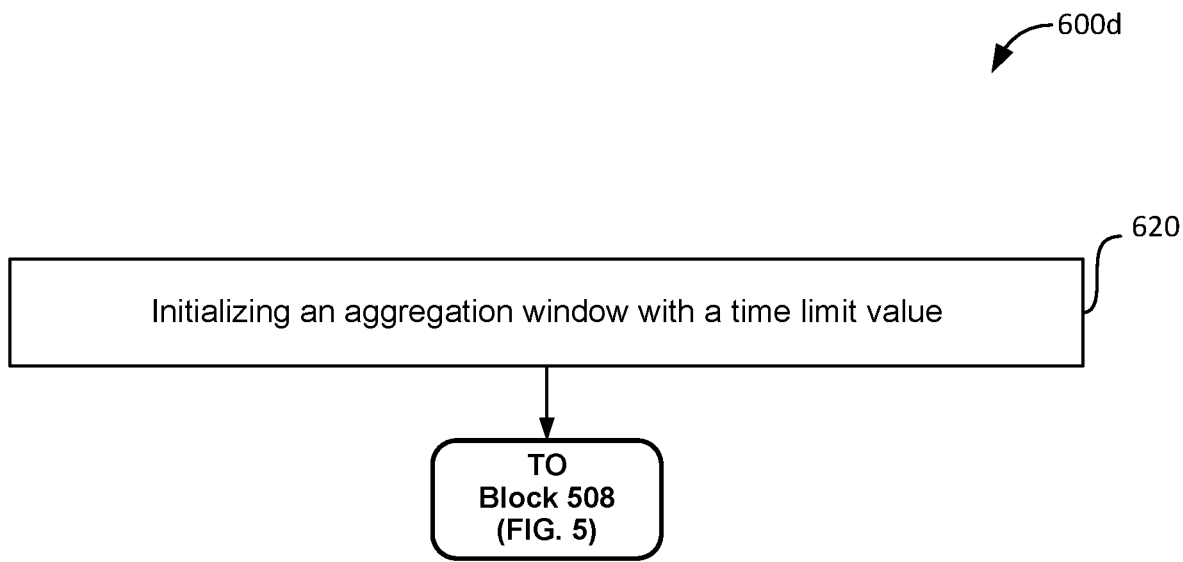

FIG. 6D is a process flow diagram illustrating an embodiment method 600*d* for managing power in a multiple-chiplet system that may be implemented as part of the method 500 in some embodiments. With reference to FIGS. 1-6D, the method 600*d* may be implemented in a processor (e.g., processing cores 124*a*, 124*b*, 124*c*, 124*d* controlling power controllers 112*a*, 112*b*, 112*c*, 112*d* and communication interfaces 114*a*, 114*b*, 114*c*, 114*d* respectively) configured to perform operations of the method. In some embodiments, the processor (e.g., processing cores 124*a*, 124*b*, 124*c*, 124*d*) may be configured to perform the operations by processor-executable instruction stored in a non-transitory processor-readable medium (e.g., memory devices 122*a*, 122*b*, 122*c*, and 122*d*). Means for performing each of the operations of the method 600*d* may be a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In block 620, the first chiplet communication interface may initialize an aggregation window with a time limit value, in which the power rail adjustment message is generated upon expiration of the aggregation window. After the expiration of the aggregation window, the first chiplet communication interface (e.g., master chiplet communication interface 114*a*) may generate a power rail adjustment message based on the voltage change message in block 508 of the method 500 (FIG. 5) as described. In other words, the power rail adjustment message may be generated in response to the expiration of the aggregation window. The processes in block 614 may be performed as described with reference to operations 206 and 306 of FIGS. 2 and 3 respectively. Means for performing the operations in block 620 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

Figure 6E:
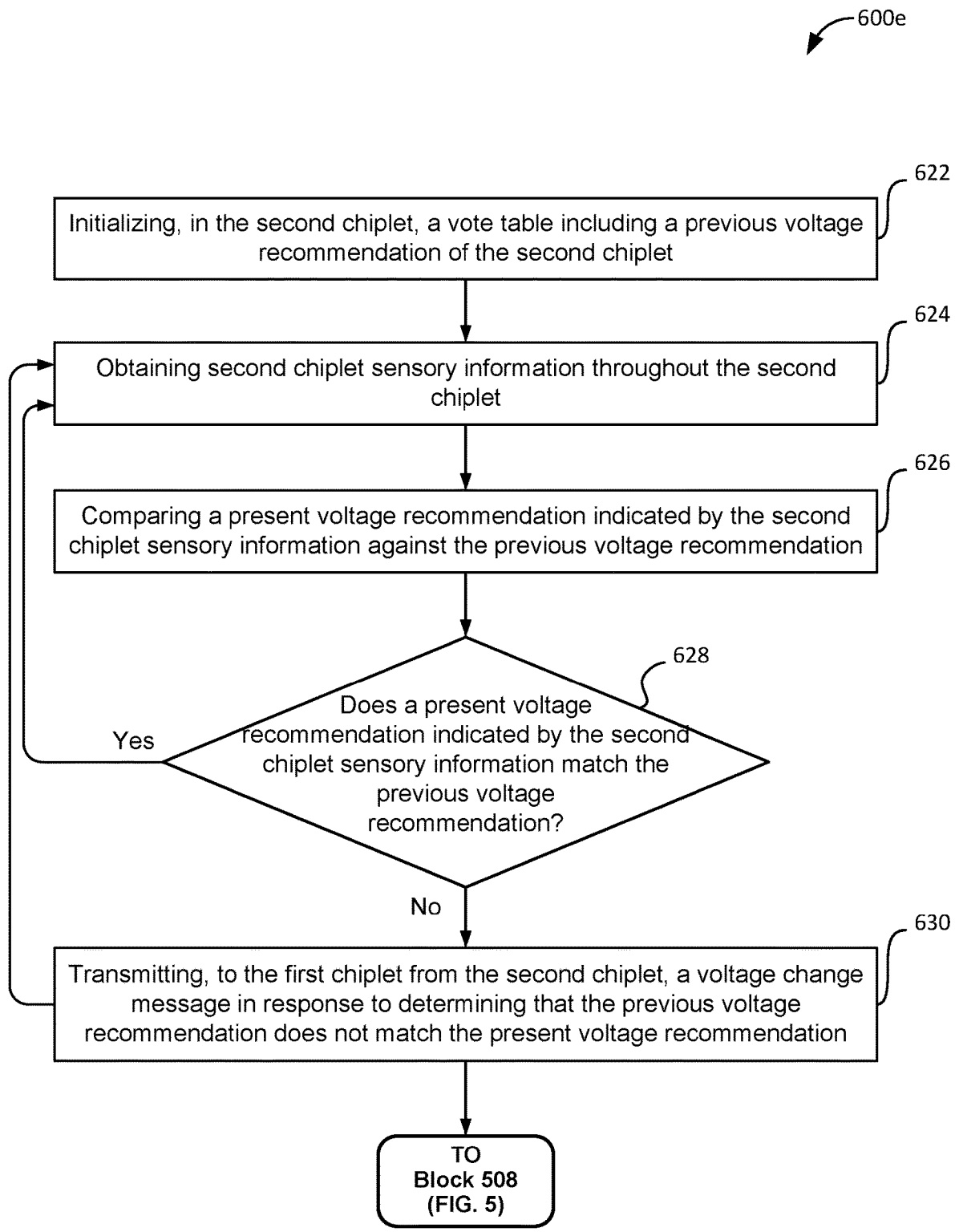

FIG. 6E is a process flow diagram illustrating an embodiment method 600*e* for managing power in a multiple-chiplet system that may be implemented as part of the method 500 in some embodiments. With reference to FIGS. 1-6E, the method 600*e* may be implemented in a processor (e.g., processing cores 124*a*, 124*b*, 124*c*, 124*d* controlling power controllers 112*a*, 112*b*, 112*c*, 112*d* and communication interfaces 114*a*, 114*b*, 114*c*, 114*d* respectively) configured to perform operations of the method. In some embodiments, the processor (e.g., processing cores 124*a*, 124*b*, 124*c*, 124*d*) may be configured to perform the operations by processor-executable instruction stored in a non-transitory processor-readable medium (e.g., memory devices 122*a*, 122*b*, 122*c*, and 122*d*). Means for performing each of the operations of the method 600*e* may be a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

The order of operations performed in blocks 622-630 is merely illustrative, and the operations of blocks 622-630 may be performed in any order and partially simultaneously in some embodiments. In some embodiments, the method 600*e* may be performed by a processor of a device independently from, but in conjunction with, an external memory device. For example, the method 600*e* may be implemented as a software module executing within a processor of an SOC or in dedicated hardware within an SOC that issues commands to establish secure memory channels and access memory of an external memory device and is otherwise configured to take actions and store data as described.

In block 622, a vote table including a previous voltage recommendation may be initialized by the second chiplet. The vote table may be initialized by and stored by the second chiplet communication interface (e.g., slave chiplet communication interface 114*b*) in preparation of comparing the previous voltage recommendation with a new voltage recommendation. The processes in block 622 may be performed as described with reference to operation 406 of FIG. 4. Means for performing the operations in block 622 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In block 624, a second chiplet power controller may obtain second chiplet sensory information throughout a second chiplet. A second chiplet power controller (e.g., slave chiplet power controller 112*b*) may obtain and aggregate sensory information corresponding to sensory parameters (e.g., temperature, power, voltage, current values) measured by sensors (e.g., sensors 116*b*) throughout the second chiplet (e.g., slave chiplet 110*b*). The processes in block 624 may be performed as described with reference to operations 224, 226, 228, 326, 330, 412, and 418 of FIGS. 2, 3, and 4 respectively. Means for performing the operations in block 624 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In block 626, the second chiplet communication interface may compare a present voltage recommendation indicated by the second chiplet sensory information against the previous voltage recommendation. The second chiplet communication interface (e.g., slave chiplet communication interface 114*b*) may compare a present voltage recommendation indicated by the second chiplet sensory information (i.e., received from the second chiplet power controller in the form of a voltage change message) against the previous voltage recommendation stored in the vote table initialized in block 622. The processes in block 626 may be performed as described with reference to operations 422 of FIG. 4. Means for performing the operations in block 626 may include a processor of the multiple-chiplet system 100, such as the processing cores 124*a*, 124*b*, 124*c*, 124*d*, the power controllers 112*a*, 112*b*, 112*c*, 112*d*, communication interfaces 114*a*, 114*b*, 114*c*, 114*d*, and/or the like.

In determination block 628, the second chiplet communication interface may determine whether the present voltage recommendation indicated by the second chiplet sensory information matches the previous voltage recommendation stored in the second chiplet communication interface vote table. The second chiplet communication interface (e.g., slave chiplet communication interface 114*b*) may determine whether the present voltage recommendation matches the previous, or latest, voltage recommendation to determine if a voltage of the second chiplet (e.g., slave chiplet 110*b*) should be adjusted. The processes in block 626 may be performed as described with reference to operations 422 of FIG. 4. Means for performing the operations in determination block 628 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In response to determining that the present voltage recommendation indicated by the second chiplet sensory information does match the previous voltage recommendation stored in the second chiplet communication interface vote table (i.e., determination block 628="Yes"), the second chiplet power controller continue to iteratively obtain second chiplet sensory information throughout the second chiplet as described in block 624 until the second chiplet power controller determines the present voltage recommendation indicated by the second chiplet sensory information does not match the previous voltage recommendation stored in the second chiplet communication interface vote table (i.e., a voltage of the second chiplet should be adjusted).

In response to determining that the present voltage recommendation indicated by the second chiplet sensory information does not match the previous voltage recommendation stored in the second chiplet communication interface vote table (i.e., determination block 628="No"), the second chiplet communication interface may transmit a voltage change message to the first chiplet communication interface in block 630. The processes in block 630 may be performed as described with reference to communication 424 of FIG. 4. Means for performing the operations in block 630 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

Figure 6F:
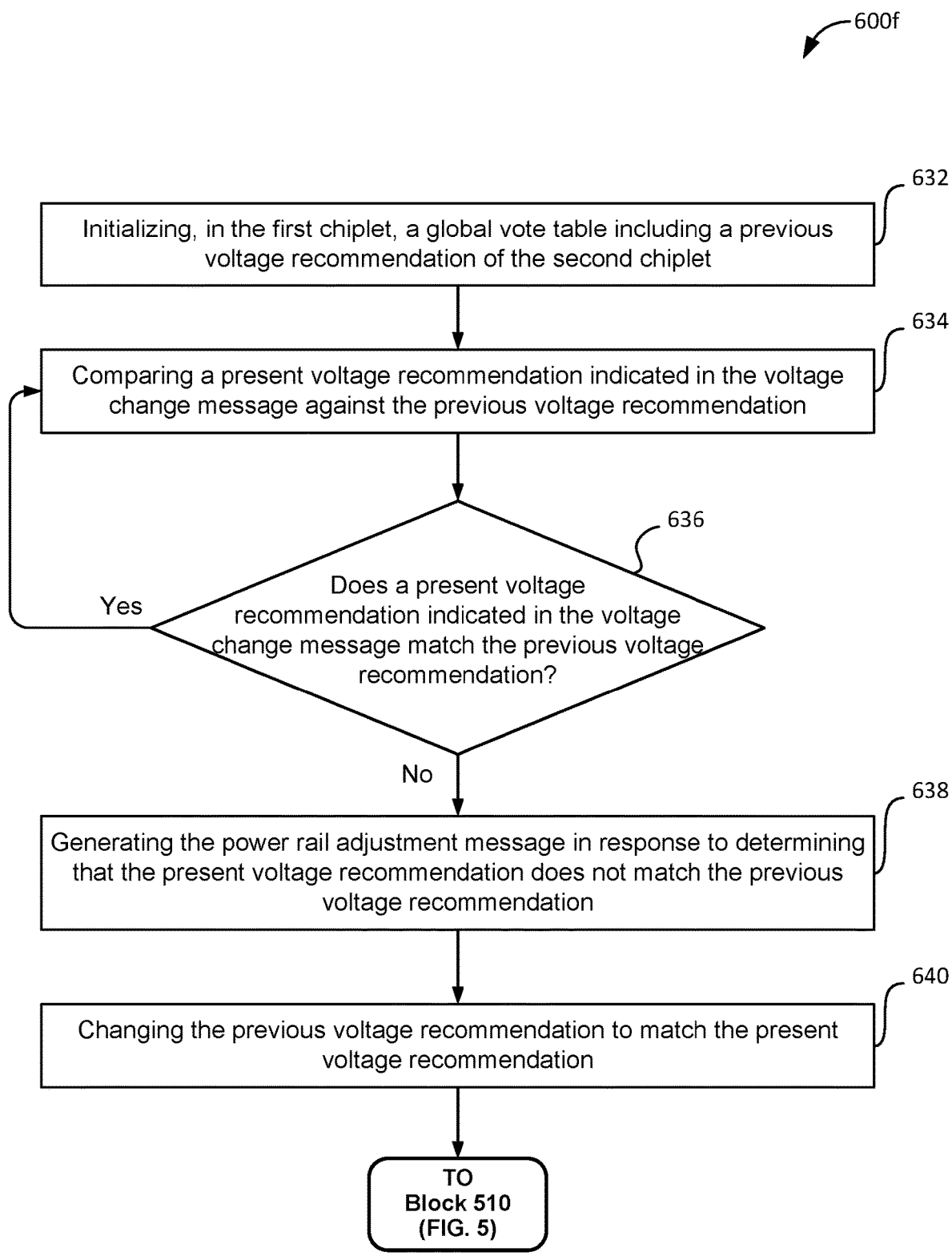

FIG. 6F is a process flow diagram illustrating an embodiment method 600f for managing power in a multiple-chiplet system that may be implemented as part of the method 500 in some embodiments. With reference to FIGS. 1-6F, the method 600f may be implemented in a processor (e.g., processing cores 124a, 124b, 124c, 124d controlling power controllers 112a, 112b, 112c, 112d and communication interfaces 114a, 114b, 114c, 114d respectively) configured to perform operations of the method. In some embodiments, the processor (e.g., processing cores 124a, 124b, 124c, 124d) may be configured to perform the operations by processor-executable instruction stored in a non-transitory processor-readable medium (e.g., memory devices 122a, 122b, 122c, and 122d). Means for performing each of the operations of the method 600f may be a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

The order of operations performed in blocks 632-640 is merely illustrative, and the operations of blocks 632-640 may be performed in any order and partially simultaneously in some embodiments. In some embodiments, the method 600f may be performed by a processor of a device independently from, but in conjunction with, an external memory device. For example, the method 600f may be implemented as a software module executing within a processor of an SOC or in dedicated hardware within an SOC that issues commands to establish secure memory channels and access memory of an external memory device and is otherwise configured to take actions and store data as described.

In block 632, a global vote table including a previous voltage recommendation of the second chiplet may be initialized by the first chiplet. The global vote table may be initialized by and stored by the first chiplet communication interface (e.g., master chiplet communication interface 114a) in preparation of comparing the previous voltage recommendation of the second chiplet with a new voltage recommendation of the second chiplet. The processes in block 632 may be performed as described with reference to operations 306 and 406 of FIGS. 3 and 4. Means for performing the operations in block 632 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 634, the first chiplet communication interface may compare a present voltage recommendation indicated in the voltage change message against the previous voltage recommendation. The first chiplet communication interface (e.g., master chiplet communication interface 114a) may compare a present voltage recommendation indicated by the voltage change message received from the second chiplet communication interface (e.g., slave Chiplet communication interface 114b) against the previous voltage recommendation of the second chiplet (e.g., slave chiplet 110b) stored in the global vote table initialized in block 632. The processes in block 634 may be performed as described with reference to operations 346 and 428 of FIGS. 3 and 4. Means for performing the operations in block 634 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In determination block 636, the first chiplet communication interface may determine whether the present voltage recommendation indicated in the voltage change message matches the previous voltage recommendation stored in the first chiplet communication interface global vote table. The first chiplet communication interface (e.g., master chiplet communication interface 114a) may determine whether the present voltage recommendation matches the previous, or latest, voltage recommendation to determine if a voltage of the second chiplet (e.g., slave chiplet 110b) should be adjusted. The processes in block 634 may be performed as described with reference to operations 346 and 428 of FIGS. 3 and 4. Means for performing the operations in determination block 636 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In response to determining that the present voltage recommendation indicated in the voltage change message does match the previous voltage recommendation stored in the first chiplet communication interface global vote table (i.e., determination block 636="Yes"), the first chiplet communication interface may continue to iteratively compare a present voltage recommendation with a previous voltage recommendation as described in block 634 until the first chiplet communication interface determines the present voltage recommendation indicated by the voltage change message does not match the previous voltage recommendation stored in the first chiplet communication interface global vote table (i.e., a voltage of the second chiplet should be adjusted).

In response to determining that the present voltage recommendation indicated in the voltage change message does match the previous voltage recommendation stored in the first chiplet communication interface global vote table (i.e., determination block 636="No"), the first chiplet communication interface may generate the power rail adjustment message in block 638. The processes in block 638 may be performed as described with reference to operations 348 and 432 of FIGS. 3 and 4. Means for performing the operations in block 638 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 640, the first chiplet communication interface may change the previous voltage recommendation to match the present voltage recommendation. The first chiplet communication interface (e.g., master chiplet communication interface) may alter the previous voltage recommendation stored by the first chiplet communication in the global vote table to match the present voltage recommendation or be equal to a status value indicating the present voltage recommendation. The processes in block 640 may be performed as described with reference to operations 350 and 436 of FIGS. 3 and 4. Means for performing the operations in block 640 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

Figure 6G:
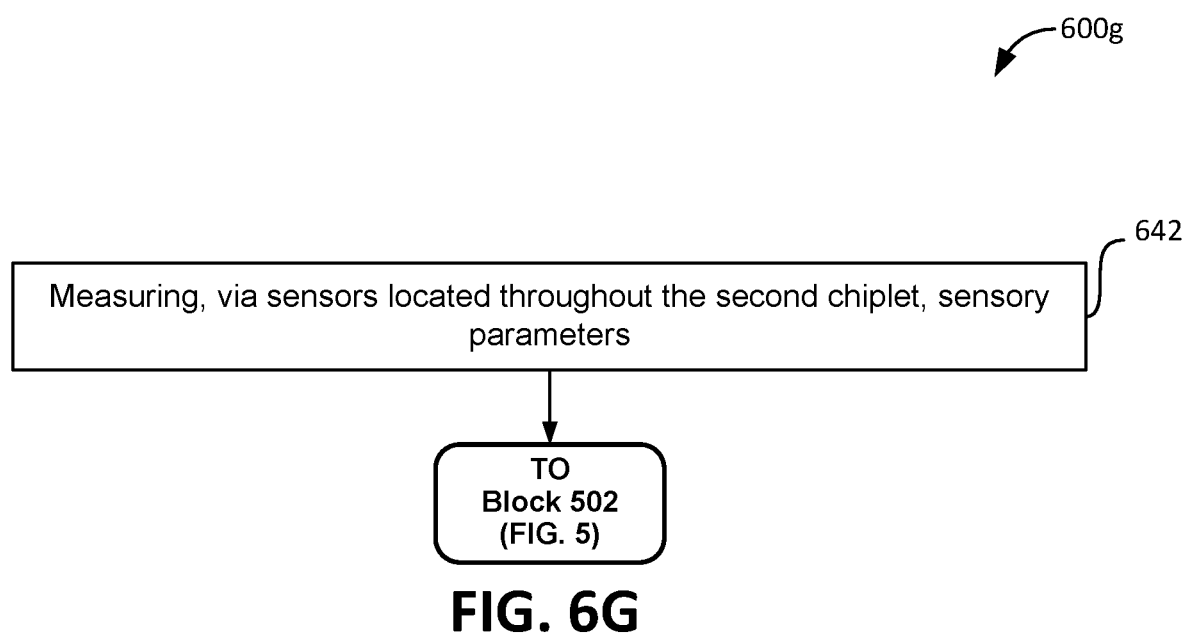

FIG. 6G is a process flow diagram illustrating an embodiment method 600g for managing power in a multiple-chiplet system that may be implemented as part of the method 500 in some embodiments. With reference to FIGS. 1-6G, the method 600g may be implemented in a processor (e.g., processing cores 124a, 124b, 124c, 124d controlling power controllers 112a, 112b, 112c, 112d and communication interfaces 114a, 114b, 114c, 114d respectively) configured to perform operations of the method. In some embodiments, the processor (e.g., processing cores 124a, 124b, 124c, 124d) may be configured to perform the operations by processor-executable instruction stored in a non-transitory processor-readable medium (e.g., memory devices 122a, 122b, 122c, and 122d). Means for performing each of the operations of the method 600g may be a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

In block 642, sensors located throughout the second chiplet may measure sensory parameters. Sensors (e.g., sensors 116b) may be positioned throughout a second chiplet (e.g., slave chiplet 110b) die, and may measure and relay sensory parameters including power, voltage, current, and/or temperature information to the second chiplet power controller (e.g., slave chiplet power controller 112b). The second sensory information may be based on the sensory parameters measured by the sensors. The second chiplet power controller may continue to perform operations of block 502 of the method 500 (FIG. 5) as described. Means for performing the operations in block 642 may include a processor of the multiple-chiplet system 100, such as the processing cores 124a, 124b, 124c, 124d, the power controllers 112a, 112b, 112c, 112d, communication interfaces 114a, 114b, 114c, 114d, and/or the like.

Figure 7:
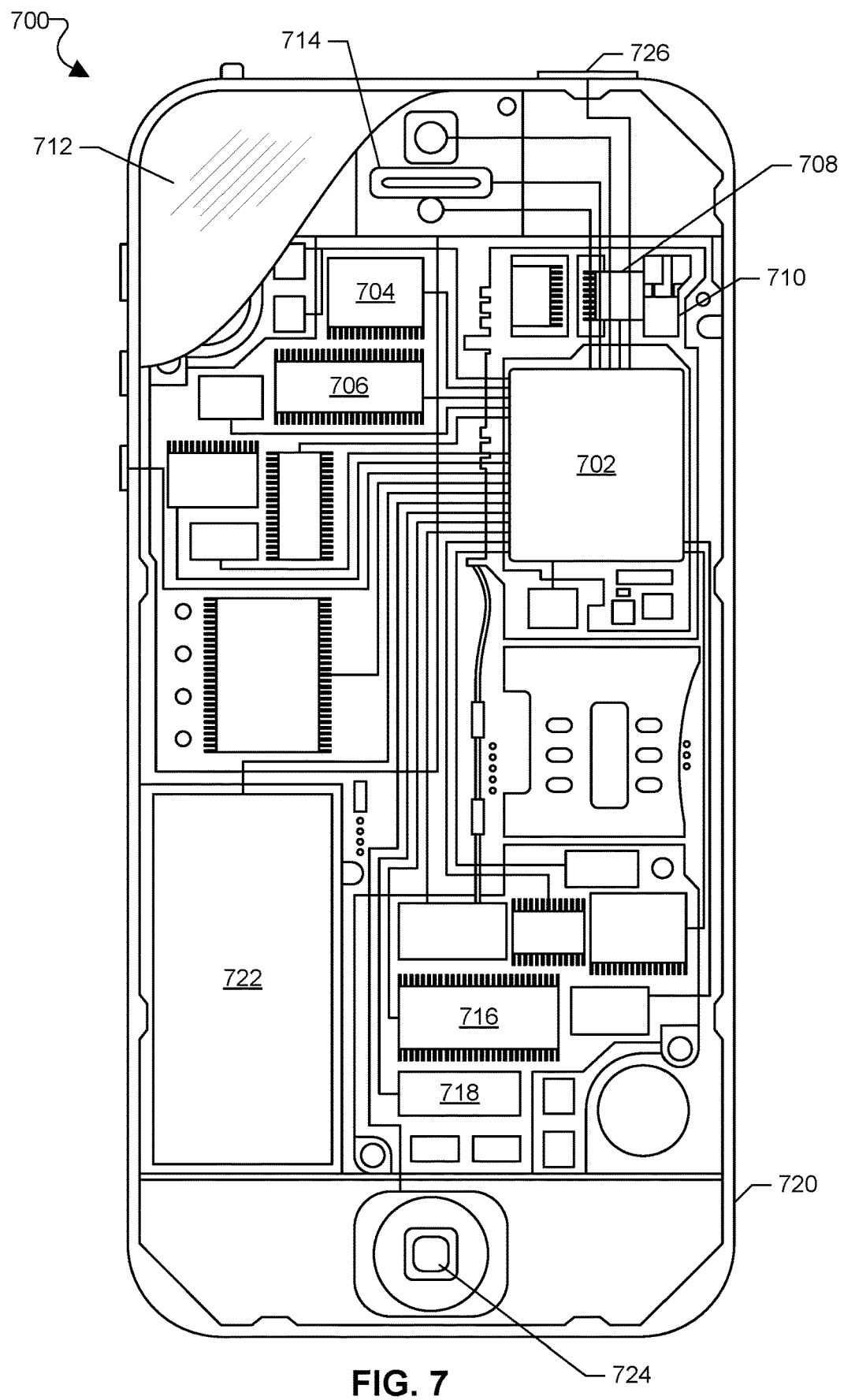
FIG. 7 is a component block diagram illustrating an example wireless communication device suitable for use with the various embodiments.

The various embodiments (including, but not limited to, embodiments described above with reference to FIGS. 1-6G) may be implemented in a wide variety of computing systems including automotive vehicles or other mobile computing devices, an example of which suitable for use with the various embodiments is illustrated in FIG. 7. With reference to FIGS. 1-7, a mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that may be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, Zig-Bee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
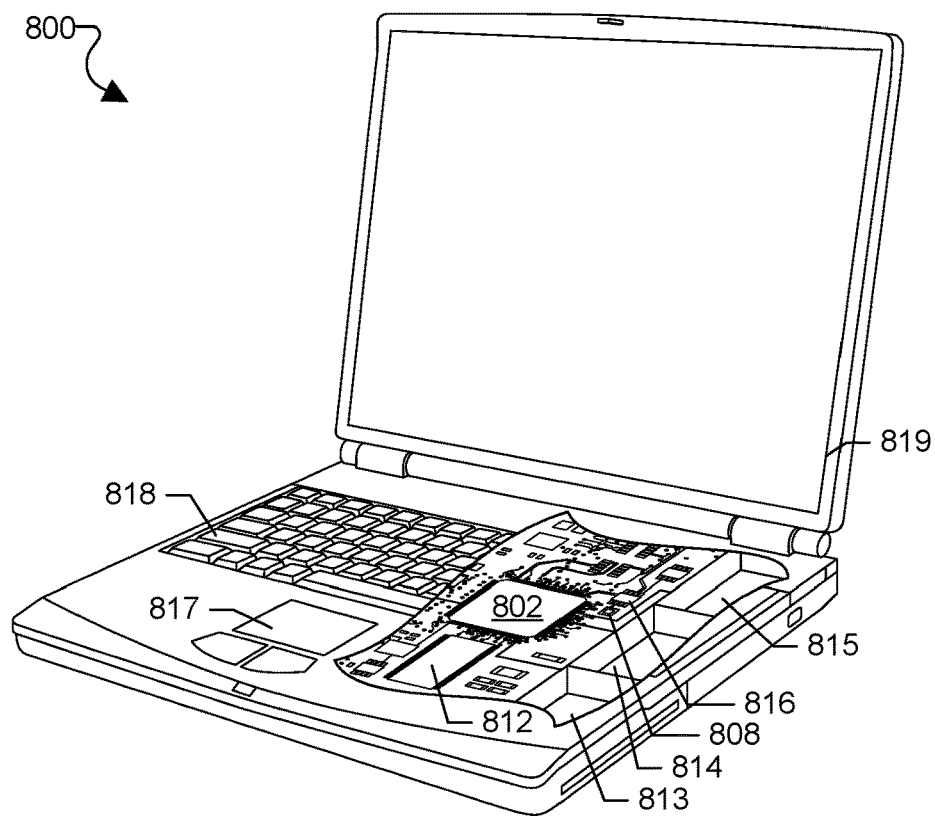
FIG. 8 is a component block diagram illustrating an example computing device suitable for use with the various embodiments.

The various embodiments (including, but not limited to, embodiments described above with reference to FIGS. 1-6G) may be implemented in a wide variety of computing systems include a laptop computer 800 an example of which is illustrated in FIG. 8. With reference to FIGS. 1-8, a laptop computer may include a touchpad touch surface 817 that serves as the computer's pointing device, and thus may receive drag, scroll, and flick gestures similar to those implemented on computing devices equipped with a touch screen display and described above. A laptop computer 800 will typically include a processor 802 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a compact disc (CD) drive 815 coupled to the processor 802. The laptop computer 800 may include a touchpad 817, a keyboard 818, and a display 819 all coupled to the processor 802. Other configurations of the computing device may include a computer mouse or trackball coupled to the processor (e.g., via a USB input) as are well known, which may also be used in conjunction with the various embodiments.

Figure 9:
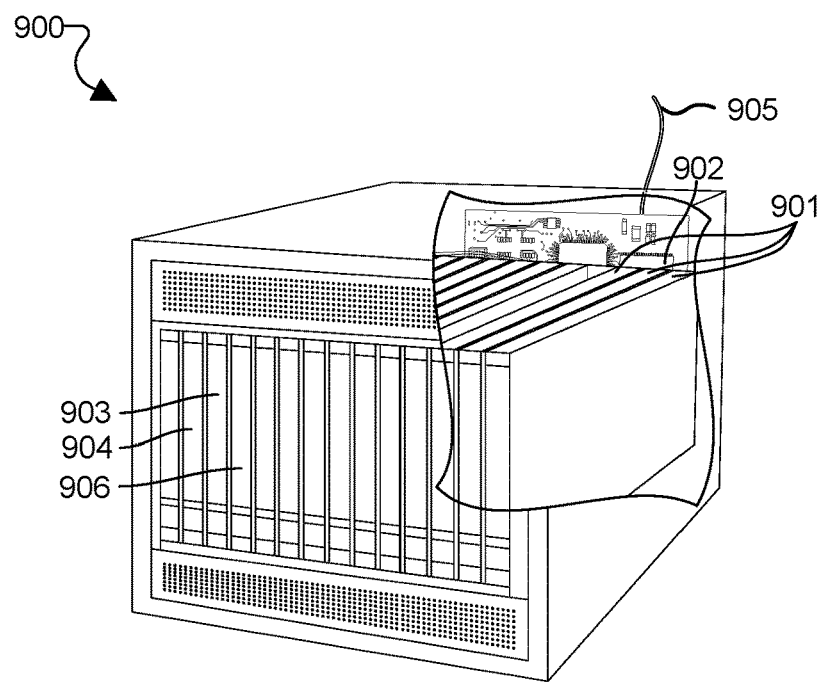
FIG. 9 is a component block diagram illustrating an example server suitable for use with the various embodiments.

The various embodiments (including, but not limited to, embodiments described above with reference to FIGS. 1-6G) may also be implemented in fixed computing systems, such as any of a variety of commercially available servers. With reference to FIGS. 1-9, an example server 900 is illustrated in FIG. 9. Such a server 900 typically includes one or more multicore processor assemblies 901 coupled to volatile memory 902 and a large capacity nonvolatile memory, such as a disk drive 904. As illustrated in FIG. 9, multicore processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multicore processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Implementation examples are described in the following paragraphs. Implementation examples described in terms of example methods further include: the example methods implemented in circuitry and processors configured with processor-executable instructions to perform operations of the example methods; the example methods implemented in means for performing functions of the methods; and the example methods implemented in a non-transitory processor-readable storage medium having stored thereon processor-executable instructions configured to cause a chiplet processor to perform operations of the example methods.

Example 1. A system-on-a-chip (SoC) including: a first chiplet; a second chiplet; a shared power rail coupled to the first chiplet and the second chiplet; and a power management integrated circuit (PMIC) configured to supply power to the first chiplet and the second chiplet across the shared power rail, in which: the first chiplet is configured to obtain first sensory information throughout the first chiplet; the second chiplet is configured to obtain second sensory information throughout the second chiplet and to transmit a voltage change message to the first chiplet based on the second sensory information; the first chiplet is configured to transmit a power rail adjustment message to the PMIC based on the first sensory information and the voltage change message; and the PMIC is configured to adjust voltage of at least one of the first chiplet and the second chiplet.

Example 2. The SoC of example 1, in which: the first chiplet includes: a first set of sensors configured to obtain the first sensory information by measuring first sensory parameters throughout the first chiplet; a first power controller configured to receive the first sensory information from the first set of sensors; and a first communication interface configured to receive a first voltage change message from the first power controller based on the first sensory information; the second chiplet includes: a second set of sensors configured to obtain the second sensory information by measuring second sensory parameters throughout the second chiplet; a second power controller configured to receive the second sensory information from the second set of sensors; and a second communication interface configured to receive a second voltage change message from the second power controller based on the second sensory information; and the power rail adjustment message is based on the first voltage change message and the second voltage change message.

Example 3. The SoC of any of examples 1-2, further including: an interface bus communicably connecting the PMIC, the first chiplet, and the second chiplet, in which the interface bus is a system power management interface (SPMI).

Example 4. The SoC of example 3, in which the second chiplet is further configured to transmit an independent power rail adjustment message to the PMIC based on the second sensory information, and in which the PMIC is further configured to adjust voltage of the second chiplet based on the independent power rail adjustment message.

Example 5. The SoC of any of examples 1-4, further including: an inter-interface circuit (I2C) bus communicably connecting the PMIC and the first chiplet, in which the first chiplet is configured to transmit the power rail adjustment message to the PMIC across the I2C bus.

Example 6. The SoC of any of examples 1-5, further including: a controller-to-controller interface configured to convey the voltage change message from the second chiplet to the first chiplet.

Example 7. The SoC of any of examples 1-6, further including: a power rail shared by the first chiplet and the second chiplet and controlled by the PMIC, in which the PMIC is configured to adjust the voltage of at least one of the first chiplet and the second chiplet by adjusting a voltage across the power rail.

Example 8. The SoC of example 7, in which the power rail is an embedded memory (MX) power rail or a core logic (CX) power rail.

Example 9. The SoC of any of examples 1-8, further including: a third chiplet configured to obtain third sensory information by measuring third sensory parameters throughout the third chiplet, and configured to transmit a second voltage change message to the first chiplet based on the third sensory information; in which the power rail adjustment message is based in part on the second voltage change message, and in which the PMIC is configured to adjust the voltage of at least one of the first chiplet, the second chiplet, and the third chiplet.

Example 10. The SoC of any of examples 1-9, in which the first and second sensory information includes at least one of temperature information, voltage information, or current information.

Example 11. A method for power management of multiple chiplets within a system-on-a-chip (SoC), including: obtaining, via a second chiplet power controller, second chiplet sensory information throughout a second chiplet; determining, via the second chiplet power controller, whether a voltage of the second chiplet should be adjusted based on the second chiplet sensory information; transmitting, to a first chiplet communication interface of a first chiplet from a second chiplet communication interface, a voltage change message in response to determining that a voltage of the second chiplet should be adjusted; generating, via the first chiplet communication interface, a power rail adjustment message based on the voltage change message; transmitting, via the first chiplet communication interface, the power rail adjustment message to a power management integrated circuit (PMIC); and adjusting, via the PMIC, a voltage across a power rail shared by the first chiplet and the second chiplet based on the power rail adjustment message.

Example 12. The method of example 11, in which the second sensory information includes at least one of temperature information, voltage information, and current information.

Example 13. The method of any of examples 11-12, further including: measuring, via sensors located throughout the second chiplet, sensory parameters, in which the second sensory information is based on the sensory parameters.

Example 14. The method of any of examples 11-13, in which determining whether a voltage of the second chiplet should be adjusted based on the second chiplet sensory information further includes determining whether the second sensory information indicates that a sensory parameter is outside of a threshold range.

Example 15. The method of any of examples 11-14, further including: obtaining, via a first chiplet power controller, first chiplet sensory information throughout the first chiplet; and determining, via the first chiplet power controller, whether a voltage of the first chiplet should be adjusted based on the first chiplet sensory information, in which generating the power rail adjustment message based on the voltage change message further includes generating the power rail adjustment message based on the voltage change message and the first chiplet sensory information in response to determining that a voltage of the first chiplet should be adjusted.

Example 16. The method of any of examples 11-15, in which obtaining second chiplet sensory information throughout the second chiplet includes iteratively obtaining second chiplet power information throughout the second chiplet, the method further including: initializing a down vote counter on the second chiplet with a down counter value; determining whether the voltage of the second chiplet should be decreased based on the second chiplet power information; and incrementing the down vote counter in response to determining that the voltage of the second chiplet should be decreased, in which the down vote counter is incremented for each iteration of obtaining second chiplet sensory information indicating that the voltage of the second chiplet should be decreased; in which transmitting the voltage change message to the first chiplet includes transmitting the voltage change message in response to the down vote counter reaching the down vote counter value.

Example 17. The method of example 16, further including: transmitting, from the first chiplet to the second chiplet, a reset message to cause the second chiplet to reset the down vote counter.

Example 18. The method of any of examples 11-17, further including: initializing an aggregation window with a time limit value, in which the power rail adjustment message is generated upon expiration of the aggregation window.

Example 19. The method of any of examples 11-18, further including: initializing, in the second chiplet, a vote table including a previous voltage recommendation of the second chiplet, in which determining whether the voltage of the second chiplet should be adjusted based on the second chiplet sensory information includes comparing a present voltage recommendation indicated by the second chiplet sensory information against the previous voltage recommendation; and transmitting, to the first chiplet from the second chiplet, a voltage change message in response to determining that the previous voltage recommendation does not match the present voltage recommendation.

Example 20. The method of any of examples 11-19, further including: initializing, in the first chiplet, a global vote table including a previous voltage recommendation of the second chiplet; comparing a present voltage recommendation indicated in the voltage change message against the previous voltage recommendation; generating the power rail adjustment message in response to determining that the present voltage recommendation does not match the previous voltage recommendation; and changing the previous voltage recommendation to match the present voltage recommendation.

Example 21. A method for a first chiplet to manage a power rail of multiple chiplets within a system-on-a-chip (SoC), including: receiving, from a second chiplet, a voltage change message including second chiplet sensory information measured throughout the second chiplet; determining whether a voltage of the second chiplet should be adjusted based on the voltage change message; and transmitting, to a power management integrated circuit (PMIC), a power rail adjustment message in response to determining that a voltage of the second chiplet should be adjusted, in which the power rail adjustment message includes instructions to cause the PMIC to adjust the voltage of the second chiplet.

22. The method of example 21, further including: obtaining first chiplet sensory information throughout the first chiplet; and determining whether a voltage of the first chiplet should be adjusted based on the first chiplet sensory information, in which generating the power rail adjustment message based on the voltage change message further includes generating the power rail adjustment message based on the voltage change message and the first chiplet sensory information in response to determining that a voltage of the first chiplet should be adjusted.

Example 23. The method of any of examples 21-22, further including: initializing an aggregation window with a time limit value, in which the power rail adjustment message is generated upon expiration of the aggregation window.

Example 24. The method of any of examples 21-23, further including: initializing, in the first chiplet, a global vote table including a previous voltage recommendation of the second chiplet; comparing a present voltage recommendation indicated in the voltage change message against the previous voltage recommendation; generating the power rail adjustment message in response to determining that the present voltage recommendation does not match the previous voltage recommendation; and changing the previous voltage recommendation to match the present voltage recommendation.

Example 25. A system-on-a-chip (SoC), including: a first chiplet; a second chiplet; means for obtaining second chiplet sensory information throughout a second chiplet; means for determining whether a voltage of the second chiplet should be adjusted based on the second chiplet sensory information; means for transmitting, to the first chiplet from the second chiplet, a voltage change message in response to determining that a voltage of the second chiplet should be adjusted; means for generating a power rail adjustment message based on the voltage change message; means for transmitting the power rail adjustment message to a power management integrated circuit (PMIC) from the first chiplet; and means for adjusting, via the PMIC, a voltage across a power rail shared by the first chiplet and the second chiplet based on the power rail adjustment message.

Example 26. The SoC of example 25, further including: means for measuring sensory parameters, in which the second sensory information is based on the sensory parameters.

Example 27. The SoC of any of examples 25-26, further including: means for obtaining first chiplet sensory information throughout the first chiplet; and means for determining whether a voltage of the first chiplet should be adjusted based on the first chiplet sensory information, in which means for generating the power rail adjustment message based on the voltage change message includes means for generating the power rail adjustment message based on the voltage change message and the first chiplet sensory information in response to determining that a voltage of the first chiplet should be adjusted.

Example 28. The SoC of any of examples 25-27, further including: means for initializing a down vote counter on the second chiplet with a down counter value, in which means for obtaining second chiplet sensory information throughout the second chiplet includes means for iteratively obtaining second chiplet power information throughout the second chiplet; means for determining whether the voltage of the second chiplet should be decreased based on the second chiplet power information; and means for incrementing the down vote counter in response to determining that the voltage of the second chiplet should be decreased, in which the down vote counter is incremented for each iteration of obtaining second chiplet sensory information indicating that the voltage of the second chiplet should be decreased; in which means for transmitting the voltage change message to the first chiplet includes means for transmitting the voltage change message in response to the down vote counter reaching the down vote counter value.

Example 29. The SoC of example 28, further including: means for transmitting, from the first chiplet to the second chiplet, a reset message to cause the second chiplet to reset the down vote counter.

Example 30. The SoC of any of examples 25-29, further including: means for initializing an aggregation window with a time limit value, in which the power rail adjustment message is generated upon expiration of the aggregation window.

Example 31. The SoC of any of examples 25-30, further including: means for initializing, in the second chiplet, a vote table including a previous voltage recommendation of the second chiplet, in which means for determining whether the voltage of the second chiplet should be adjusted based on the second chiplet sensory information includes means for comparing a present voltage recommendation indicated by the second chiplet sensory information against the previous voltage recommendation; and means for transmitting, to the first chiplet from the second chiplet, a voltage change message in response to determining that the previous voltage recommendation does not match the present voltage recommendation.

Example 32. The SoC of any of examples 25-31, further including: means for initializing, in the first chiplet, a global vote table including a previous voltage recommendation of the second chiplet; means for comparing a present voltage recommendation indicated in the voltage change message against the previous voltage recommendation; means for generating the power rail adjustment message in response to determining that the present voltage recommendation does not match the previous voltage recommendation; and means for changing the previous voltage recommendation to match the present voltage recommendation.

Computer program code or "program code" for execution on a programmable processor for carrying out operations of the various embodiments may be written in a high-level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A system-on-a-chip (SoC) comprising:
 a first chiplet comprising:
  a first set of sensors configured to measure first sensory parameters throughout the first chiplet;
  a first power controller configured to receive the first sensory information from the first set of sensors; and
  a first communication interface configured to receive a first voltage change message from the first power controller based on the first sensory information;
 a second chiplet comprising:
  a second set of sensors configured to measure second sensory parameters throughout the second chiplet;
  a second power controller configured to receive the second sensory information from the second set of sensors;
  a second communication interface configured to receive a second voltage change message from the second power controller based on the second sensory information; and
  a vote counter that is configured to be initialized with a vote counter value and to increment the vote counter in response to receiving the second voltage change message to adjust a voltage of the second chiplet; and
 a shared power rail coupled to the first chiplet and the second chiplet; and
 a power management integrated circuit (PMIC) configured to supply power to the first chiplet and the second chiplet across the shared power rail, wherein:
  the first communication interface is configured to receive the second voltage change message from the second communication interface;
  the first communication interface is configured to transmit to the PMIC a power rail adjustment message based on the first voltage change message and the second voltage change message; and
  the PMIC is configured to adjust voltage of at least one of the first chiplet and the second chiplet based on the power rail adjustment message.

2. The SoC of claim 1, further comprising:
 an interface bus communicably connecting the PMIC, the first chiplet, and the second chiplet, wherein the interface bus is a system power management interface (SPMI).

3. The SoC of claim 2, wherein:
 the second chiplet is further configured to transmit an independent power rail adjustment message to the PMIC based on the second sensory information, and
 the PMIC is further configured to adjust voltage of the second chiplet based on the independent power rail adjustment message.

4. The SoC of claim 1, further comprising:
 an inter-interface circuit (I²C) bus communicably connecting the PMIC and the first chiplet,
 wherein the first chiplet is configured to transmit the power rail adjustment message to the PMIC across the I²C bus.

5. The SoC of claim 1, further comprising:
 a controller-to-controller interface configured to convey the voltage change message from the second chiplet to the first chiplet.

6. The SoC of claim 1, further comprising:
 a power rail shared by the first chiplet and the second chiplet and controlled by the PMIC,
 wherein the PMIC is configured to adjust the voltage of at least one of the first chiplet and the second chiplet by adjusting a voltage across the power rail.

7. The SoC of claim 6, wherein the power rail is an embedded memory (MX) power rail or a core logic (CX) power rail.

8. The SoC of claim 1, further comprising:
 a third chiplet configured to obtain third sensory information by measuring third sensory parameters throughout the third chiplet, and configured to transmit the second voltage change message to the first chiplet based on the third sensory information,
 wherein the power rail adjustment message is based in part on the second voltage change message, and
 wherein the PMIC is configured to adjust the voltage of at least one of the first chiplet, the second chiplet, and the third chiplet.

9. The SoC of claim 1, wherein the first and second sensory information includes at least one of temperature information, voltage information, or current information.

10. A method for power management of multiple chiplets within a system-on-a-chip (SoC), comprising:
 obtaining, via a second chiplet power controller, second chiplet sensory information throughout a second chiplet;
 initializing a vote counter on the second chiplet with a vote counter value;
 determining, via the second chiplet power controller, whether a voltage of the second chiplet should be adjusted based on the second chiplet sensory information;
 incrementing the vote counter in response to determining that the voltage of the second chiplet should be adjusted, wherein the vote counter is incremented for each iteration of obtaining second chiplet sensory information indicating that the voltage of the second chiplet should be adjusted;

transmitting, to a first chiplet communication interface of a first chiplet from a second chiplet communication interface, a voltage change message in response to the vote counter reaching the vote counter value;

generating, via the first chiplet communication interface, a power rail adjustment message based on the voltage change message;

transmitting, via the first chiplet communication interface, the power rail adjustment message to a power management integrated circuit (PMIC); and adjusting, via the PMIC, a voltage across a power rail shared by the first chiplet and the second chiplet based on the power rail adjustment message.

11. The method of claim 10, wherein the second chiplet sensory information includes at least one of temperature information, voltage information, or current information.

12. The method of claim 10, further comprising:
measuring, via sensors located throughout the second chiplet, sensory parameters,
wherein the second chiplet sensory information is based on the sensory parameters.

13. The method of claim 10, wherein determining whether a voltage of the second chiplet should be adjusted based on the second chiplet sensory information further comprises determining whether the second chiplet sensory information indicates that a sensory parameter is outside of a threshold range.

14. The method of claim 10, further comprising:
obtaining, via a first chiplet power controller, first chiplet sensory information throughout the first chiplet; and
determining, via the first chiplet power controller, whether a voltage of the first chiplet should be adjusted based on the first chiplet sensory information,
wherein generating the power rail adjustment message based on the voltage change message further comprises generating the power rail adjustment message based on the voltage change message and the first chiplet sensory information in response to determining that a voltage of the first chiplet should be adjusted.

15. The method of claim 10, wherein:
obtaining second chiplet sensory information throughout the second chiplet includes iteratively obtaining second chiplet power information throughout the second chiplet, the method further comprising
initializing the vote counter on the second chiplet with the vote counter value comprises initializing a down vote counter on the second chiplet with a down vote counter value;
determining, via the second chiplet power controller, whether the voltage of the second chiplet should be adjusted based on the second chiplet sensory information comprises determining whether the voltage of the second chiplet should be decreased based on the second chiplet power information;
incrementing the vote counter in response to determining that the voltage of the second chiplet should be adjusted comprises incrementing the down vote counter in response to determining that the voltage of the second chiplet should be decreased, and
transmitting the voltage change message in response to the vote counter reaching the vote counter value comprises transmitting the voltage change message in response to the down vote counter reaching the down vote counter value.

16. The method of claim 10, further comprising:
transmitting, from the first chiplet to the second chiplet, a reset message to cause the second chiplet to reset the vote counter.

17. The method of claim 10, further comprising:
initializing an aggregation window with a time limit value, wherein the power rail adjustment message is generated upon expiration of the aggregation window.

18. The method of claim 10, further comprising:
initializing, in the second chiplet, a vote table including a previous voltage recommendation of the second chiplet, wherein determining whether the voltage of the second chiplet should be adjusted based on the second chiplet sensory information comprises comparing a present voltage recommendation indicated by the second chiplet sensory information against the previous voltage recommendation; and
transmitting, to the first chiplet from the second chiplet, a voltage change message in response to determining that the previous voltage recommendation does not match the present voltage recommendation.

19. The method of claim 10, further comprising:
initializing, in the first chiplet, a global vote table including a previous voltage recommendation of the second chiplet; and
comparing a present voltage recommendation indicated in the voltage change message against the previous voltage recommendation,
wherein generating the power rail adjustment message comprises generating the power rail adjustment message in response to determining that the present voltage recommendation does not match the previous voltage recommendation; and
changing the previous voltage recommendation to match the present voltage recommendation.

20. A method for a first chiplet to manage a power rail of multiple chiplets within a system-on-a-chip (SoC), comprising:
receiving, at the first chiplet from a second chiplet, a voltage change message including second chiplet sensory information measured throughout the second chiplet in response to a vote counter initialized on the second chiplet reaching a vote counter value, wherein the vote counter is incremented for each iteratively obtained second chiplet sensory information indicating that the voltage of the second chiplet should be adjusted;
determining whether a voltage of the second chiplet should be adjusted based on the voltage change message; and
transmitting, to a power management integrated circuit (PMIC), a power rail adjustment message in response to determining that a voltage of the second chiplet should be adjusted, wherein the power rail adjustment message includes instructions to cause the PMIC to adjust the voltage of the second chiplet.

21. The method of claim 20, further comprising:
obtaining first chiplet sensory information throughout the first chiplet;
determining whether a voltage of the first chiplet should be adjusted based on the first chiplet sensory information; and
generating the power rail adjustment message based on the voltage change message from the second chiplet and the first chiplet sensory information in response to determining that a voltage of the first chiplet should be adjusted.

22. The method of claim 20, further comprising:
initializing an aggregation window with a time limit value, wherein the power rail adjustment message is generated upon expiration of the aggregation window.

23. The method of claim 20, further comprising:
initializing, in the first chiplet, a global vote table including a previous voltage recommendation of the second chiplet;
comparing a present voltage recommendation indicated in the voltage change message against the previous voltage recommendation;
generating the power rail adjustment message in response to determining that the present voltage recommendation does not match the previous voltage recommendation; and
changing the previous voltage recommendation to match the present voltage recommendation.

24. A system-on-a-chip (SoC), comprising:
a first chiplet;
a second chiplet;
means for obtaining second chiplet sensory information throughout the second chiplet;
means for initializing a vote counter on the second chiplet with a vote counter value;
means for determining whether a voltage of the second chiplet should be adjusted based on the second chiplet sensory information;
means for incrementing the vote counter in response to determining that the voltage of the second chiplet should be adjusted, wherein the vote counter is incremented for each iteration of obtaining second chiplet sensory information indicating that the voltage of the second chiplet should be adjusted;
means for transmitting, to the first chiplet from the second chiplet, a voltage change message in response to the vote counter reaching the vote counter value;
means for generating a power rail adjustment message based on the voltage change message;
means for transmitting the power rail adjustment message to a power management integrated circuit (PMIC) from the first chiplet; and
means for adjusting, via the PMIC, a voltage across a power rail shared by the first chiplet and the second chiplet based on the power rail adjustment message.

25. The SoC of claim 24, further comprising:
means for measuring sensory parameters, wherein the second chiplet sensory information is based on the sensory parameters.

26. The SoC of claim 24, further comprising:
means for obtaining first chiplet sensory information throughout the first chiplet; and
means for determining whether a voltage of the first chiplet should be adjusted based on the first chiplet sensory information,
wherein means for generating the power rail adjustment message based on the voltage change message comprises means for generating the power rail adjustment message based on the voltage change message and the first chiplet sensory information in response to determining that a voltage of the first chiplet should be adjusted.

27. The SoC of claim 24, wherein:
means for initializing the vote counter on the second chiplet with the vote counter value comprises means for initializing a down vote counter on the second chiplet with a down counter value,
means for determining, via the second chiplet power controller, whether the voltage of the second chiplet should be adjusted based on the second chiplet sensory information comprises means for determining whether the voltage of the second chiplet should be decreased based on the second chiplet power information;
means for incrementing the vote counter in response to determining that the voltage of the second chiplet should be adjusted comprises means for incrementing the down vote counter in response to determining that the voltage of the second chiplet should be decreased; and
means for transmitting the voltage change message in response to the vote counter reaching the vote counter value comprises means for transmitting the voltage change message in response to the down vote counter reaching the down vote counter value.

28. The SoC of claim 24, further comprising:
means for transmitting, from the first chiplet to the second chiplet, a reset message to cause the second chiplet to reset the vote counter.

29. The SoC of claim 24, further comprising:
means for initializing an aggregation window with a time limit value, wherein the power rail adjustment message is generated upon expiration of the aggregation window.

30. The SoC of claim 24, further comprising:
means for initializing, in the second chiplet, a vote table including a previous voltage recommendation of the second chiplet, wherein means for determining whether the voltage of the second chiplet should be adjusted based on the second chiplet sensory information comprises means for comparing a present voltage recommendation indicated by the second chiplet sensory information against the previous voltage recommendation; and
means for transmitting, to the first chiplet from the second chiplet, a voltage change message in response to determining that the previous voltage recommendation does not match the present voltage recommendation.

31. The SoC of claim 24, further comprising:
means for initializing, in the first chiplet, a global vote table including a previous voltage recommendation of the second chiplet;
means for comparing a present voltage recommendation indicated in the voltage change message against the previous voltage recommendation,
wherein means for generating the power rail adjustment message comprises means for generating the power rail adjustment message in response to determining that the present voltage recommendation does not match the previous voltage recommendation; and
means for changing the previous voltage recommendation to match the present voltage recommendation.

* * * * *